(12) United States Patent
Han

(10) Patent No.: US 9,205,720 B2
(45) Date of Patent: Dec. 8, 2015

(54) FLOW CONTROL VALVE AND AIR CONDITIONER FOR AN AUTOMOBILE EQUIPPED WITH SAME

(75) Inventor: Seong Seok Han, Daejeon (KR)

(73) Assignee: HALLA VISTEON CLIMATE CONTROL CORPORATION, Daejeon (KR)

( * ) Notice: Subject to any disclaimer, the term of this patent is extended or adjusted under 35 U.S.C. 154(b) by 1379 days.

(21) Appl. No.: 12/810,583

(22) PCT Filed: Mar. 23, 2009

(86) PCT No.: PCT/KR2009/001457
§ 371 (c)(1),
(2), (4) Date: Jun. 25, 2010

(87) PCT Pub. No.: WO2009/119998
PCT Pub. Date: Oct. 1, 2009

(65) Prior Publication Data
US 2010/0269529 A1    Oct. 28, 2010

(30) Foreign Application Priority Data

| Mar. 27, 2008 | (KR) | 10-2008-0028446 |
| Jul. 14, 2008 | (KR) | 10-2008-0067959 |
| Jul. 14, 2008 | (KR) | 10-2008-0068045 |
| Jul. 14, 2008 | (KR) | 10-2008-0068049 |
| Mar. 20, 2009 | (KR) | 10-2009-0023820 |

(51) Int. Cl.
*B60H 1/32* (2006.01)
*B60H 1/00* (2006.01)
*F16K 11/052* (2006.01)

(52) U.S. Cl.
CPC ........ *B60H 1/00485* (2013.01); *F16K 11/0525* (2013.01); *Y10T 137/86863* (2015.04)

(58) Field of Classification Search
CPC .. B60H 1/3414; B60H 1/345; B60H 1/00064; F16K 3/08
USPC .............. 62/244; 165/42; 137/625.46, 625.13
See application file for complete search history.

(56) References Cited

U.S. PATENT DOCUMENTS

| 4,506,703 | A | * | 3/1985 | Baron ...................... 137/625.43 |
| 4,513,803 | A | * | 4/1985 | Reese ........................... 152/427 |
| 4,623,001 | A | * | 11/1986 | Vogler et al. ............. 137/625.46 |
| 5,117,646 | A | * | 6/1992 | Nose et al. ...................... 62/181 |

(Continued)

FOREIGN PATENT DOCUMENTS

| DE | 11 16 088 A | 9/1956 |
| JP | 07-248066 A | 9/1995 |

(Continued)

OTHER PUBLICATIONS

Office Action of corresponding application No. PCT/DE112009/000/204.8 dated Aug. 23, 2012.

(Continued)

*Primary Examiner* — Melvin Jones
(74) *Attorney, Agent, or Firm* — Hauptman Ham, LLP

(57) ABSTRACT

The present invention provides a flow control valve which can control an amount of heat transfer medium bypassed or introduced into a heat exchange medium receiving portion according to temperature set by a user, and an air conditioner for an automobile equipped with the same, which can increase air-conditioning and cooling efficiency.

22 Claims, 18 Drawing Sheets

(56) References Cited

U.S. PATENT DOCUMENTS

| | | | |
|---|---|---|---|
| 5,911,243 A * | 6/1999 | Cohen | 137/625.46 |
| 6,896,298 B2 * | 5/2005 | Walterscheid et al. | 285/205 |
| 8,424,776 B2 * | 4/2013 | Veettil et al. | 237/12.3 A |
| 2006/0175050 A1 | 8/2006 | Kang et al. | |

FOREIGN PATENT DOCUMENTS

| | | |
|---|---|---|
| JP | 08-118943 | 5/1996 |
| JP | 08-121621 | 5/1996 |
| JP | 08-127225 | 5/1996 |
| JP | 3381412 | 5/1996 |
| JP | 2002-192936 | 7/2002 |
| JP | 2002-274160 | 9/2002 |
| JP | 2003048421 | 2/2003 |
| KR | 1020020083316 | 11/2002 |
| KR | 10-0740828 | 7/2007 |
| KR | 10-2008-0039073 | 5/2008 |
| WO | 2007/055671 A1 | 5/2007 |

OTHER PUBLICATIONS

Notice of Allowance of corresponding Korean Patent application No. 10-2008-0067959 dated Aug. 27, 2014.

Notice of Allowance of corresponding Korean Patent application No. 10-2008-0068045 dated Jun. 24, 2014.

Notice of Allowance of corresponding Korean Patent application No. 10-2008-0068049 dated Jun. 20, 2014.

* cited by examiner

Prior Art

FLOW CONTROL VALVE AND AIR CONDITIONER FOR AN AUTOMOBILE EQUIPPED WITH SAME

RELATED APPLICATIONS

The present application is based on, and claims priority from, KR Application Number 10-2008-0028446, filed Mar. 27, 2008; KR Application Number 10-2008-0067959, filed Jul. 14, 2008; KR Application Number 10-2008-0068045, filed Jul. 14, 2008; KR Application Number 10-2008-0068049, filed Jul. 14, 2008; KR Application Number 10-2009-0023820, filed Mar. 20, 2009; and PCT Application Number PCT/KR09/001457, filed Mar. 23, 2009, the disclosures of which are hereby incorporated by reference herein in their entireties.

TECHNICAL FIELD

The present invention relates to a flow control valve and an air conditioner for an automobile equipped with the same, and more particularly, to a flow control valve which can control an amount of heat transfer medium bypassed or introduced into a heat exchange medium receiving portion according to temperature set by a user, and an air conditioner for an automobile equipped with the same.

BACKGROUND ART

In the automobile industry, as general concerns about energy and environment are increased globally, the efficiency in each part including fuel efficiency has been steadily improved, and in order to satisfy various demands of customers, research and development on lighter weight, smaller size and multi-function of each vehicle component has been carried out. Particularly, in an air-conditioning unit for a vehicle, since it is generally difficult to secure an enough space in an engine room, it is required to manufacture an automobile air conditioner having a small size and high efficiency in controlling temperature and air flow.

In general, the automobile air conditioner is an apparatus for properly maintaining internal temperature of a vehicle during the summer and winter seasons, or removing frost formed on vehicle windows during rainy days or the winter season so as to secure a driver's visual field. The automobile air conditioner is configured so that external air introduced by a ventilator is passed through a heater core or an evaporator through which a refrigerant is flowed and then the cooled or heated air is distributed through vents communicated with various portions inside a vehicle.

FIG. 1 is a cross-sectional view of a conventional air conditioner of an automobile. As shown in FIG. 1, the conventional air conditioner includes an air-conditioning case 10 formed with a vent 11, 12, 13 of which an opening degree is controlled by a door 11d, 12d, 13d; a ventilator 14 which is connected with an air inlet port of the air-conditioning case 10 so as to ventilate external air; an evaporator E and a heater core H which are provided in the air-conditioning case 10; a temp door 15 which functions to control an opening degree of a cooled air passage P1 and a heated air passage P2 of the air-conditioning case 10.

As described above, in a cooling cycle of the conventional air conditioner, the temp door 15 opens the cooling air passage P1 and also closes the heated air passage P2. Therefore, the air ventilated by the ventilator 14 is converted into cooled air, while passing the evaporator E so as to be heat-exchanged with a refrigerant in the evaporator E, and flowed into the cooled air passage P1, and then discharged through the opened vent 11, 12, 13 so as to air-condition an inside of the vehicle.

Further, in a heating cycle, the temp door 15 closes the cooling air passage P1 and also opens the heated air passage P2. Therefore, the ventilated air is converted into heated air, while passing the heater core H so as to be heat-exchanged with a refrigerant in the heater core H, and flowed into the heated air passage P1, and then discharged through the opened vent 11, 12, 13 so as to heat the inside of the vehicle.

FIG. 2 is a perspective view of a conventional heater core H wherein two kinds of typical heater cores, i.e., a U-turn type heater core of FIG. 2a and a one-way type heater core are illustrated. As shown in FIG. 2, the conventional heater core H includes first and second heater tanks 21 and 22 which are disposed in parallel to be spaced apart from each other in a desired distance; inlet and outlet pipes 25 and 26 which are respectively connected with the first header tank 21 or the second header tank 22 and through which a heat exchange medium is introduced or discharged; a plurality of tubes 23 of which both ends are fixed between the first and second header tanks 21 and 23; and a fin 24 which is interposed between the tubes 23.

In FIGS. 1 and 2, the same reference numerals are designated to the same parts of an automobile air conditioner in which the conventional heater core or a heater core of the present invention is installed.

However, in the conventional automobile air conditioner, since the evaporator and the heater core are respectively fixed at particular positions and also it needs the temp door for controlling an opening degree of each of the cooled and heated air passages upon the air-conditioning and heating, it is necessary to secure a space in an engine room corresponding to a rotating radius of the temp door. Further, since its complicated structure interferes with air flow, it is difficult to obtain appropriate air volume, and also it generates a loud noise.

Furthermore, in the conventional heater core, since it is not possible to control an amount of the refrigerant which is introduced into the heater core, the high temperature refrigerant is continuously introduced into the heater core even in case of the cooling cycle. Thus, although the heated air passage is closed by the temp door so as to prevent the introduction of the heated air, air-conditioning efficiency is deteriorated by the high temperature refrigerant and the heated air.

DISCLOSURE OF INVENTION

Technical Problem

Therefore, an object of the present invention is to provide a flow control valve which can precisely control an amount of heat exchange medium introduced into a heat exchange medium receiving portion according to temperature set by a user using a plate type valve and also minimize a risk of leaking the heat exchange medium.

Another object of the present invention is to provide an air conditioner for an automobile equipped with the flow control valve, which can facilely control temperature inside the automobile and efficiently utilize a space of an engine room since the temp door is not necessary, and also in which the flow control valve can be interlocked with a subsidiary door, thereby increasing the air-conditioning and heating efficiency of the air conditioner.

Technical Solution

To achieve the above objects, the present invention provides a flow control valve, comprising a main body 310 which is formed with a plurality of partition walls 301, 302, 303 and 304 for partitioning a flowing portion 311, 312, 313, 314 into four spaces which are respectively connected with the first to fourth ports 321, 322, 323 and 324 so that a heat exchange medium is flowed; and a plate type valve 330 which is formed with a rotational shaft and a pair of door members extended from the rotational shaft so as to be rotated around the rotational shaft and which is rotated at a part of the flowing portion 311, 312, 313, 314 so as to selectively control flow of the heat exchange medium.

Preferably, the first port 321 is connected with a first inlet pipe of a heat exchange medium supplying portion so that the heat exchange medium is introduced from the heat exchange medium supplying portion, the second port 322 is connected with a second inlet pipe 212 of a heat exchange medium receiving portion 200 so that the heat exchange medium is flowed to the heat exchange medium receiving portion 200, the third port 323 is connected with a first outlet pipe 213 of the heat exchange medium receiving portion 200 so that the heat exchange medium discharged from the heat exchange medium receiving portion 200 is introduced, and the fourth port 324 is connected with a second outlet pipe 214 so that the heat exchange is discharged.

Preferably, the plate type valve 330 is rotated at a space of the first flowing portion 311 and the third flowing portion 313 so as to control an amount of the heat exchange medium introduced through the first inlet pipe 211 into the main body 310, which is introduced through the second inlet pipe 212 into the heat exchange medium receiving portion 200 and bypassed through the second outlet pipe 214.

Preferably, the main body 310 is formed with a first wall 301 which partitions between the first and second ports 321 and 322, a second wall 302 which partitions between the second and third ports 322 and 323, a third wall 303 which partitions between the third and fourth ports 323 and 324, and a fourth wall 304 which partitions between the fourth and first ports 324 and 321, and a second flowing portion 312 is defined by the first and second walls 301 and 302, a third flowing portion 313 is defined by the second and third walls 302 and 303, a fourth 314 is defined by the third and fourth walls 303 and 304, and a first flowing portion 311 is defined by the fourth and first walls 304 and 301.

Preferably, the first wall 301 is formed with a first communicating portion 316 for communicating the first and second flowing portions 311 and 312, the third wall 303 is formed with a second communicating portion 317 for communicating the third and fourth flowing portions 313 and 314, the fourth wall 304 is formed with a third communicating portion 318 for communicating the fourth and first flowing portions 314 and 311, and the second wall 302 is formed so that the second and third flowing portions 312 and 313 are not communicated with each other.

Preferably, a central shaft supporting portion 326 which supports the rotational shaft of the plate type valve 330 and contacts with the rotational shaft to prevent the heat exchange medium from being flowed among the flowing portions 311, 312, 313 and 314 is formed at a center portion of the main body 310, and an extended line L1 adjacent to the central shaft supporting portion 326 of an inner surface of the first port 321 is formed at a more inner side than an outer circumference of the first flowing portion 311, and an extended line L2 adjacent to the central shaft supporting portion 326 of an inner surface of the third port 323 is formed at a more inner side than an outer circumference of the third flowing portion 313, when viewing the main body 310 from an upper side.

Preferably, the main body 310 is formed by the lower mold 371, the upper mold 372 which forms the first and third flowing portions 311 and 313, a first core 373 which forms the first port 321 and contacts with a part of the upper mold 372 forming the first flowing portion 311 so that the first port 321 and the first flowing portion 311 form a continuous flowing path, a second core 374 which forms the second port 322 and the second flowing portion 312, a third core 375 which forms the third port 323 and contacts with a part of the upper mold 372 forming the third flowing portion 313 so that the third port 323 and the third flowing portion 313 form a continuous flowing path, and a fourth core 376 which forms the fourth port 324 and the fourth flowing portion 314.

Preferably, the first port 321 and the fourth port 324 are formed to be parallel with each other, and the second port 322 and the third port 323 are formed to be parallel with each other, and a protrusion 315 is formed to be protruded from the central shaft supporting portion 326 to the fourth flowing portion 314 in order to prevent the heat exchange medium flowed from the first flowing portion 311 or the third flowing portion 313 and discharged to the second outlet pipe 214 from being flowed backward to the first and third flowing portions 311 and 313.

Preferably, an upper surface of the main body 310 is opened so that the plate type valve 330 is inserted into the space of the first and third flowing portions 311 and 313 from an upper side, and an upper surface of the second and fourth flowing portions 312 and 314 in which the plate type valve 330 is not rotated are closed, and the flow control valve further comprises a cover 340 for sealing an opened area of the upper surface of the main body 310 and fixing the plate type valve 330.

Preferably, a valve seating portion 327 is formed to be protruded at a lower surface of the first flowing portion 311 or the third flowing portion 313, and the valve seating portion 327 is formed to be protruded along a lower circumference of the first flowing portion 311 or the third flowing portion 313, and a corresponding portion 332 of the plate type valve 330 is formed to be tapered corresponding to the valve seating portion 327.

Preferably, when the plate type valve 330 is erroneously assembled, a part of the plate type valve 330 is protruded to an upper side of the main body 310, and thus the main body 310 and the cover 340 are not assembled.

Preferably, the flow control valve further comprises a first sealing member 350 which is provided between the main body 310 and the cover 340 so as to increase a sealing ability with respect to the heat exchange medium.

Preferably, the first to fourth walls 301 to 304 are formed in a radial direction from the central shaft supporting portion 326, and the first to fourth walls 301 to 304 are formed in a vertical direction of the main body 310 so that the plate type valve 330 is closely contacted with the first wall 301 to the fourth wall 304.

Preferably, the plate type valve 330 is further provided with a second sealing member 331 at a portion thereof which is contacted with the first wall 301 to the fourth wall 304, and the flow control valve further comprises a ring member 360 which is provided at an upper portion of the plate type valve 330 so as to facilitate rotation of the plate type valve 330.

Preferably, the first port 321 is formed at a center portion of a circumference of the first flowing portion 311, and when the plate type valve 330 is positioned at a middle portion of the first flowing portion 311 and the third flowing portion 313, a connecting portion of the first port 321 and the first flowing portion 311 is divided into two sections having the same surface area, and the heat exchange medium introduced through the first inlet pipe 211 and the first port 321 can be equally transferred to the heat exchange medium receiving portion 200 and the second outlet pipe 214, and the third port 323 is formed at a center portion of a circumference of the third flowing portion 313, and when the plate type valve 330 is positioned at the middle portion of the first flowing portion 311 and the third flowing portion 313, the connecting portion of the first port 321 and the first flowing portion 311 is divided into two sections having the same surface area.

Preferably, a fixing portion 325 for fixing a bead 215 formed to be protruded outside on an outer surface of each of the first inlet pipe 211, the second inlet pipe 212, the first outlet pipe 213 and the second outlet pipe 214 which are respectively connected to the ports 321, 322, 323 and 324 is formed at each end of the ports 321, 322, 323 and 324.

Preferably, the flow control valve further comprises a case 380 which is formed with a plane portion 381 which is closely contacted with a lower surface of the main body 310 so as to prevent separation of the first inlet pipe 211, the second inlet pipe 212, the first outlet pipe 213 and the second outlet pipe 214, and a supporting portion 382 which is vertically protruded at the plane portion 381 to be closed contacted with an outer surface of the pipes 211, 212, 213 and 214 so that a bead 215 of each pipes 211, 212, 213, 214 is fixed, and the supporting portion 382 is formed with a coupling portion 384 which is coupled to the driving means 400 for operating the plate type valve 330 by a separate fixing means 385.

Preferably, the case 380 is formed with a U-shaped mounting portion 383 formed at the supporting portion 382 so as to mount the first inlet pipe 211, the second inlet pipe 212, the first outlet pipe 213 or the second outlet pipe 214.

Further, the present invention provides an air conditioner for an automobile, comprising an air-conditioning case 100 formed with a vent of which an opening degree is controlled by a door; an evaporator E which is provided in the air-conditioning case 100; a heater core H which is provided in the air-conditioning case 100 and provided with the flow control valve 300; and a subsidiary door 150 of which an opening degree is controlled so as to control an air amount bypassing the heater core H, wherein the driving means 400 of the flow control valve 300 is connected with the subsidiary door 150 to interlockingly drive the subsidiary door 150 with the flow control valve 300.

Advantageous Effects

According to the flow control valve and the air conditioner for an automobile equipped with the same of the present invention, since it is possible to reduce the risk of deformation due to the high temperature heat exchange medium by using the plate type valve, the durability is increased. Also it is possible to efficiently control an amount of the heat exchange medium by increasing sealing ability.

Further, according to the air conditioner for an automobile equipped with the same of the present invention, since it is facile to control the supplied amount of the heat exchange medium, it is possible to efficiently control the internal temperature of the automobile. And since the temp door is not necessary, it is possible to efficiently utilize a space of an engine room. Also it is possible to provide a temperature comfortable to a user by increasing the air-conditioning and heating efficiency of the air conditioner.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
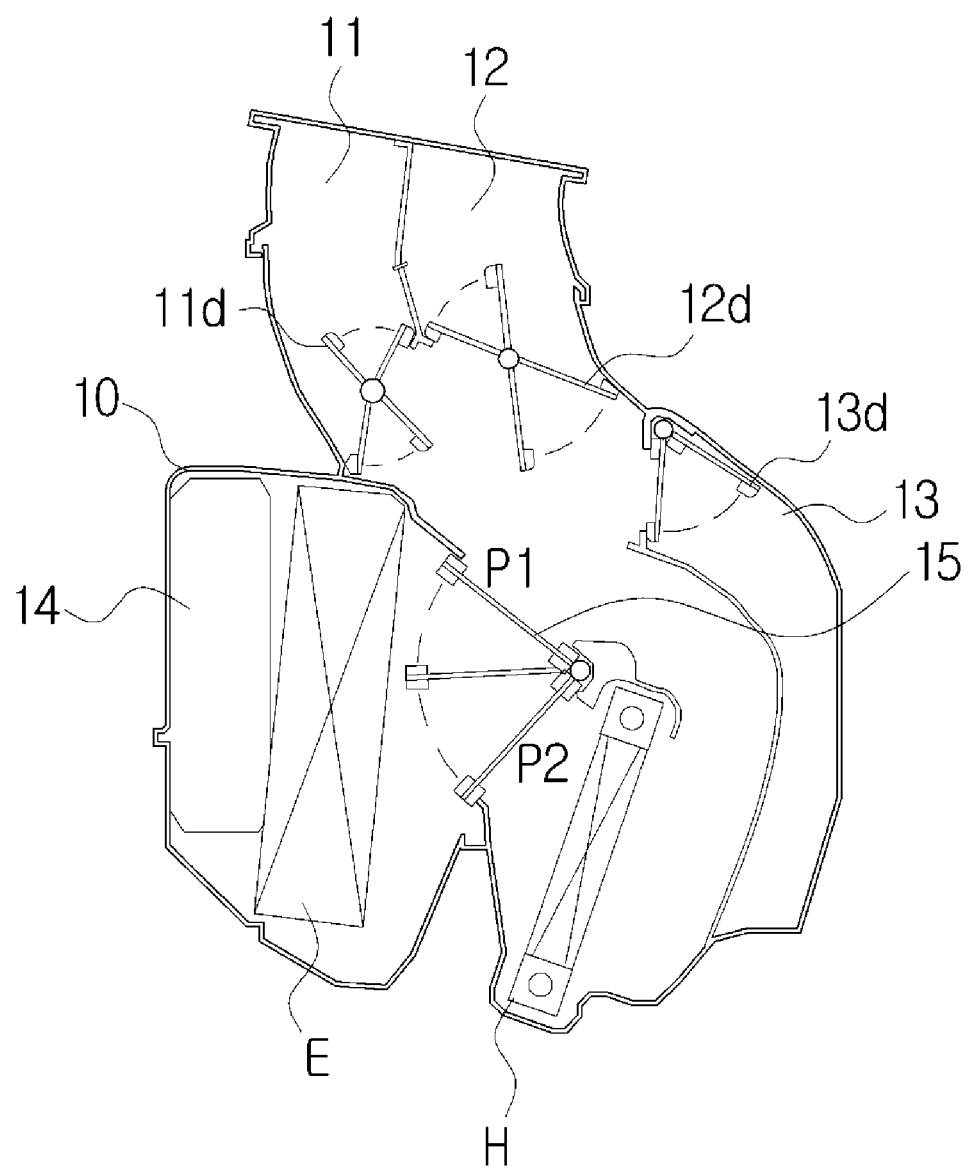
FIG. 1 is a cross-sectional view of a conventional air conditioner of an automobile.
Figure 2:
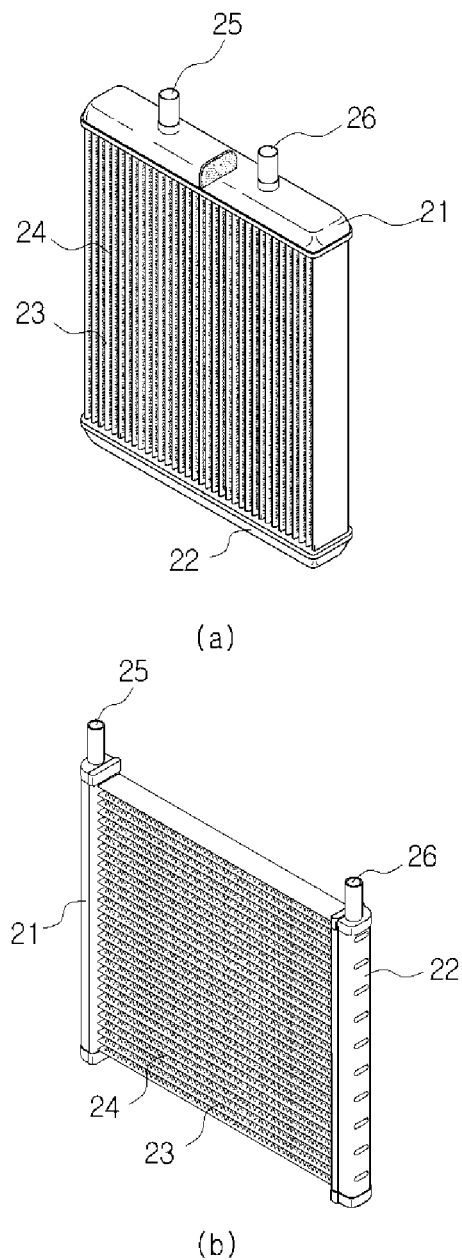
FIG. 2 is a perspective view of a general heater core.

1000: air conditioner of an automobile
100: air conditioning case
110, 120, 130: vent 110d, 120d, 130d: vent door
140: ventilator 150: subsidiary door
E: evaporator H: heater core
200: heat exchange medium receiving portion
210: first header tank 220: second header tank
211: first inlet pipe 212: second inlet pipe
213: first outlet pipe 214: second outlet pipe
215: bead 230: tube
240: fin 300: flow control valve
301: first wall 302: second wall
303: third wall 304: fourth wall
310: main body 311: first flowing portion
312: second flowing portion 313: third flowing portion
314: fourth flowing portion 315: protrusion
316: first communication portion
317: second communication portion
318: third communication portion
321: first port 322: second port
323: third port 324: fourth port
325: fixing portion
326: central shaft supporting portion
327: valve seating portion
330: plate type valve 331: second sealing member
332: corresponding portion 340: cover
350: first sealing member 360: ring member
371: lower mold 372: upper mold
373: first core 374: second core 375: third core 376: fourth core
380: case 381: plane portion
382: supporting portion 383: seating portion
384: coupling portion 385: fixing means
400: driving means

BEST MODE FOR CARRYING OUT THE
INVENTION

Hereinafter, a flow control valve 300 and an air conditioner 1000 of an automobile of the present invention will be described in detail with reference to accompanying drawings.

Figure 3:
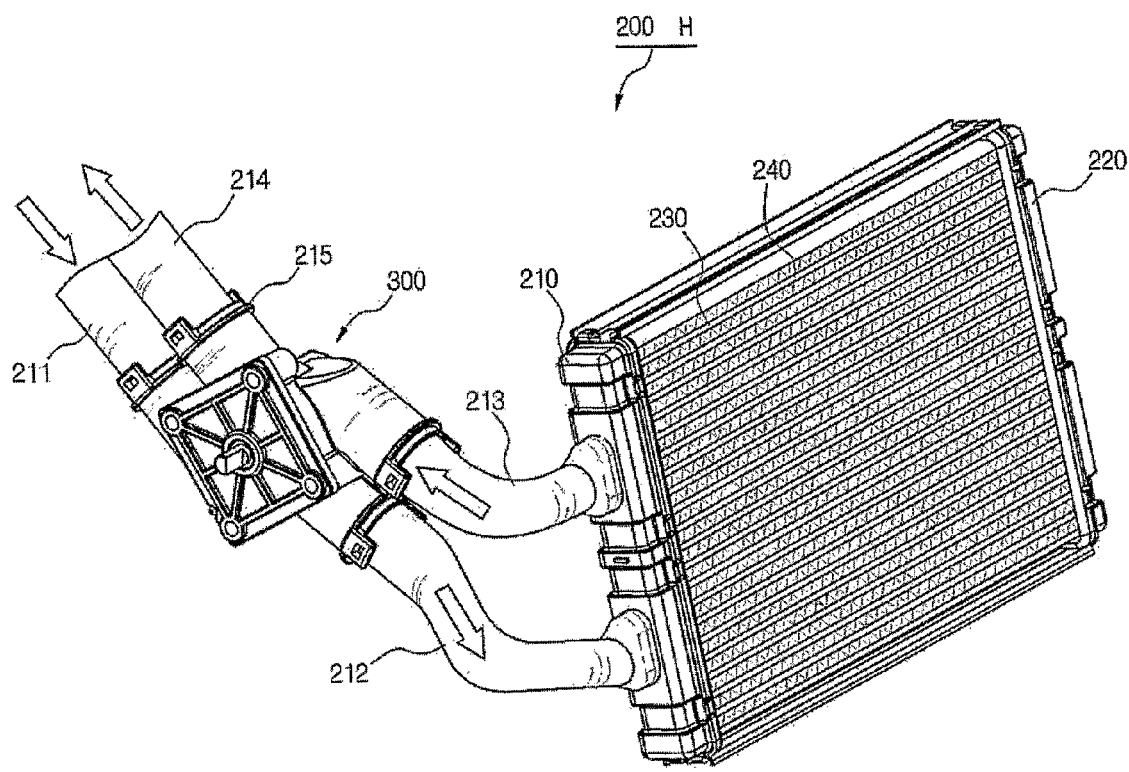
FIG. 3 is a perspective view of a flow control valve which is disposed at a heat exchange medium receiving portion according to the present invention.
Figure 4:
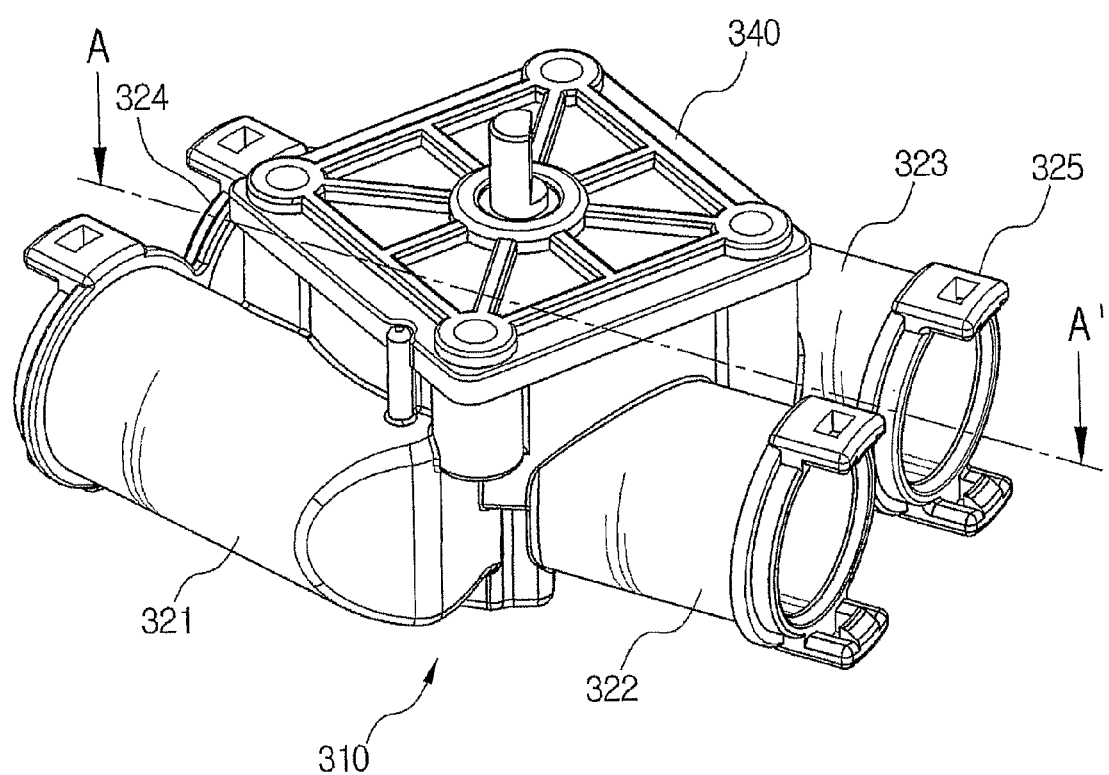
FIG. 4 is a perspective view of the flow control valve according to the present invention.
Figure 5:
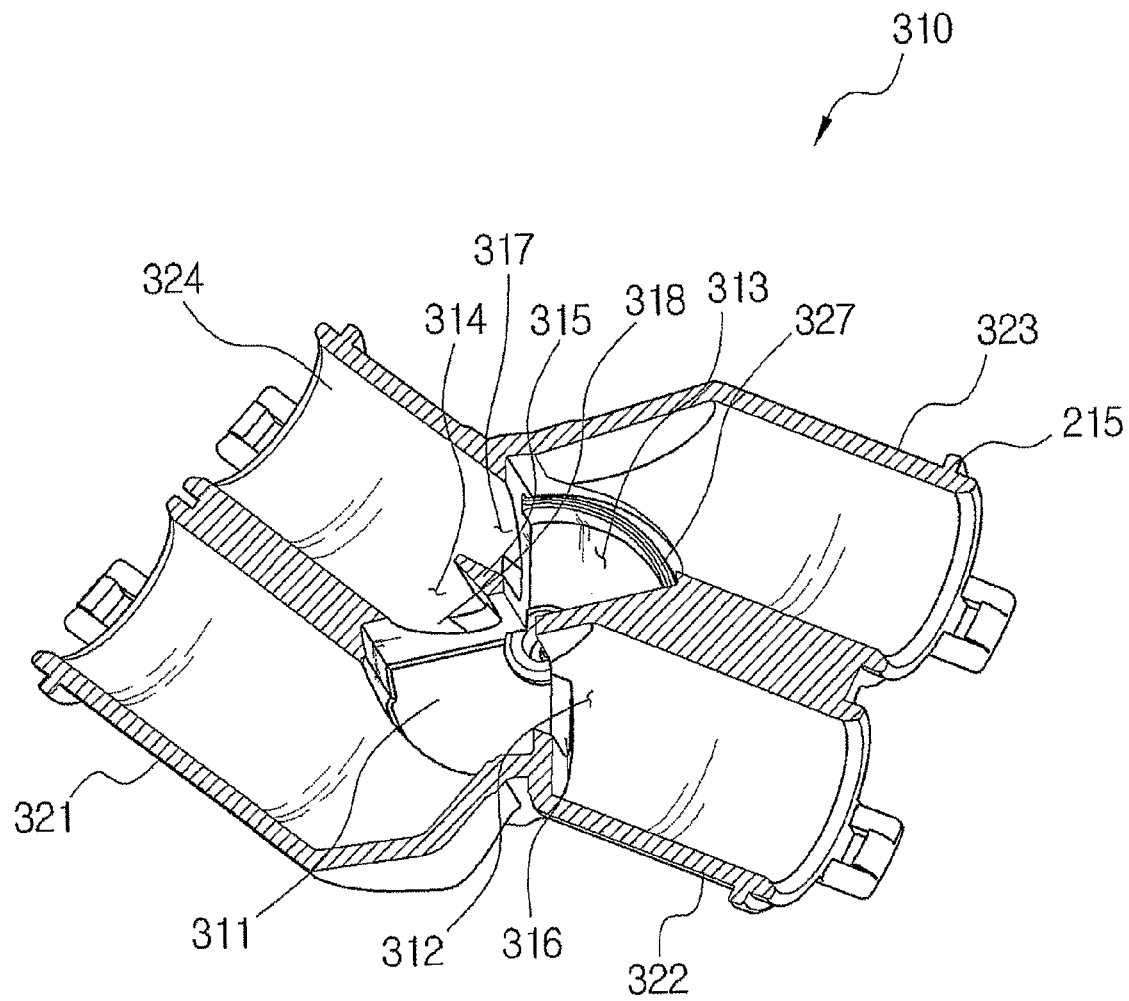
FIG. 5 is a cross-sectional view taken along a line A-A' of FIG. 4.
Figure 6:
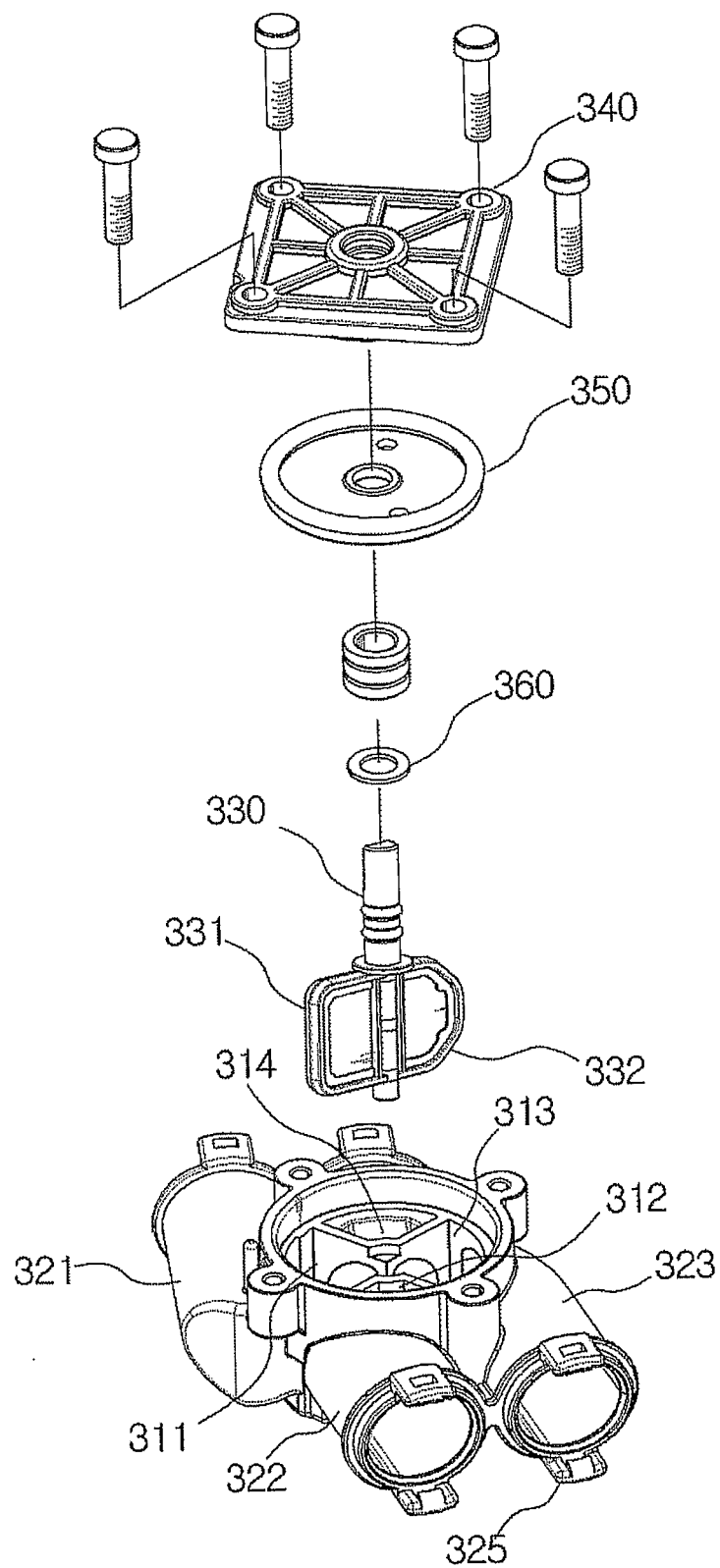
FIG. 6 is an exploded perspective view of the flow control valve of FIG. 4.
Figure 7:
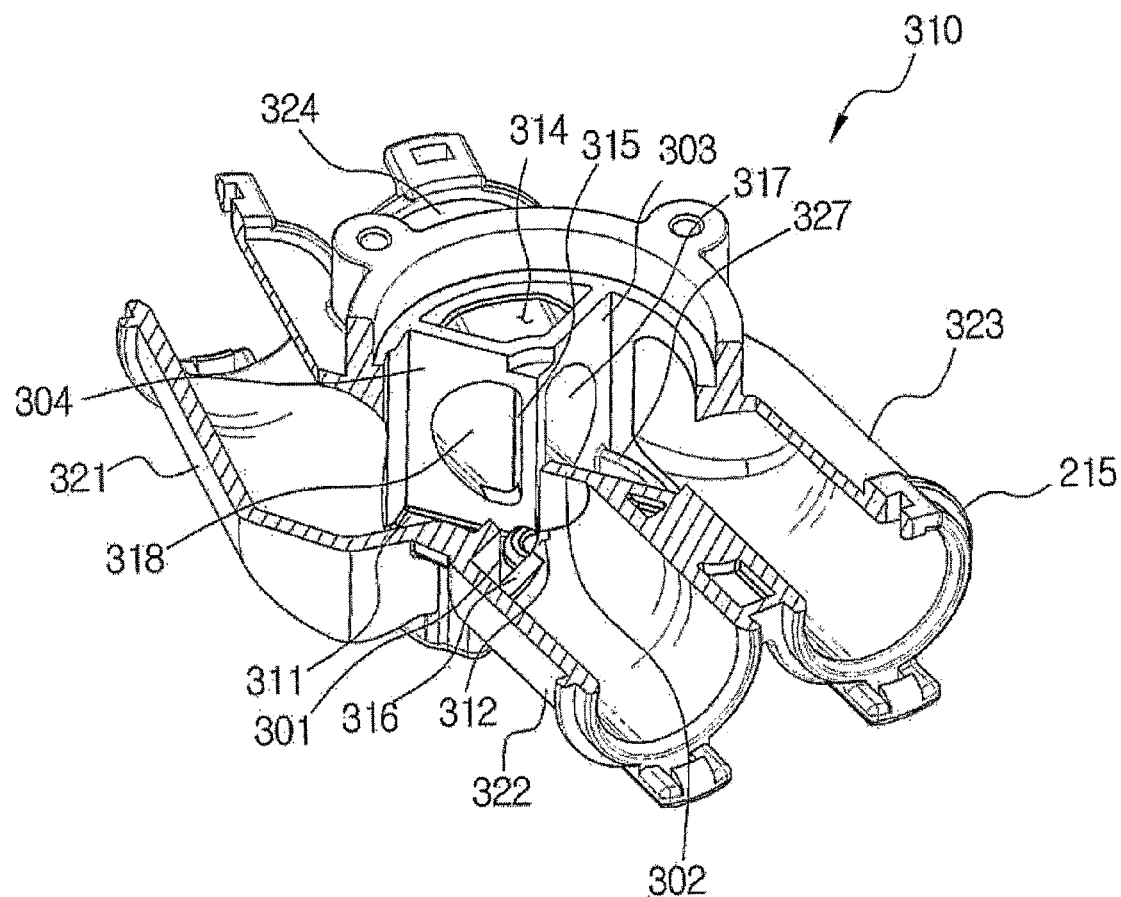
FIG. 7 is a perspective view, partially cut away, of a main body of the flow control valve according to the present invention.
Figure 8:
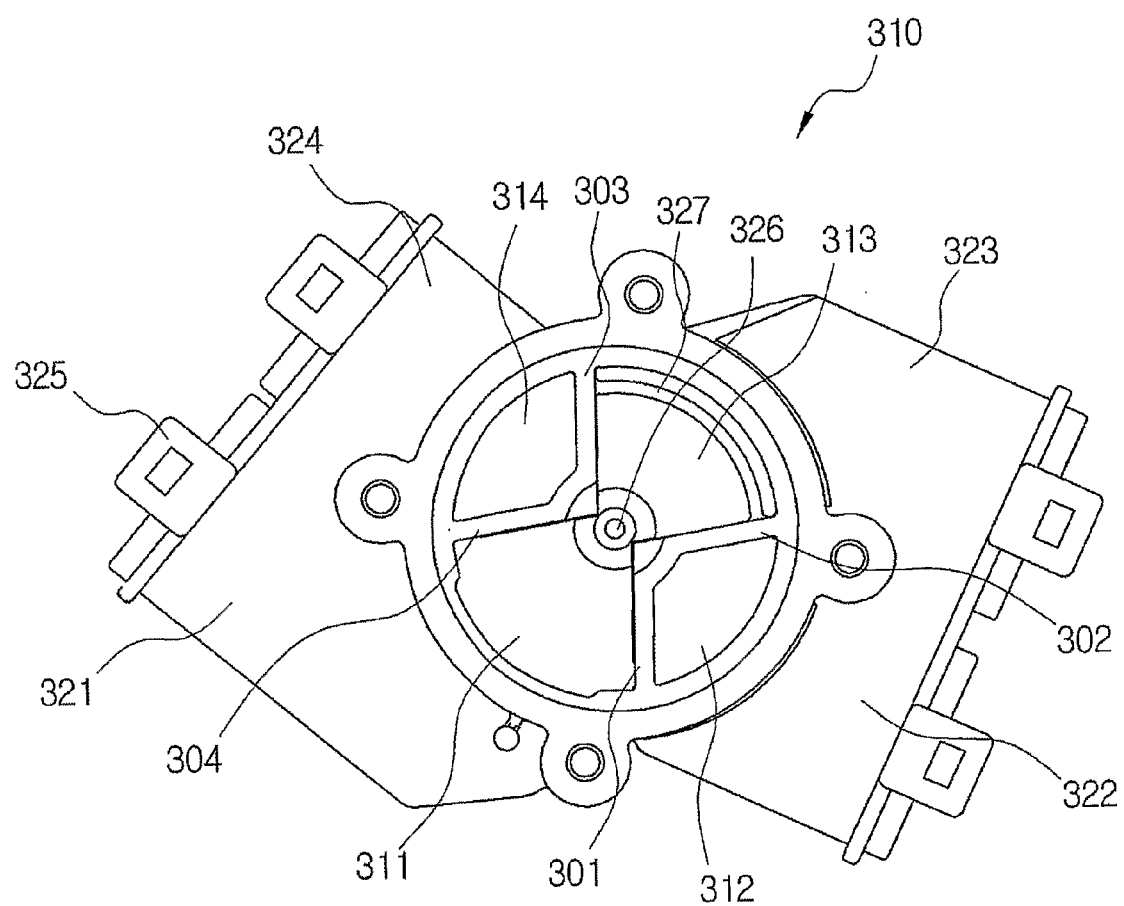
FIG. 8 is a plane view of the main body of the flow control valve according to the present invention.
Figure 9:
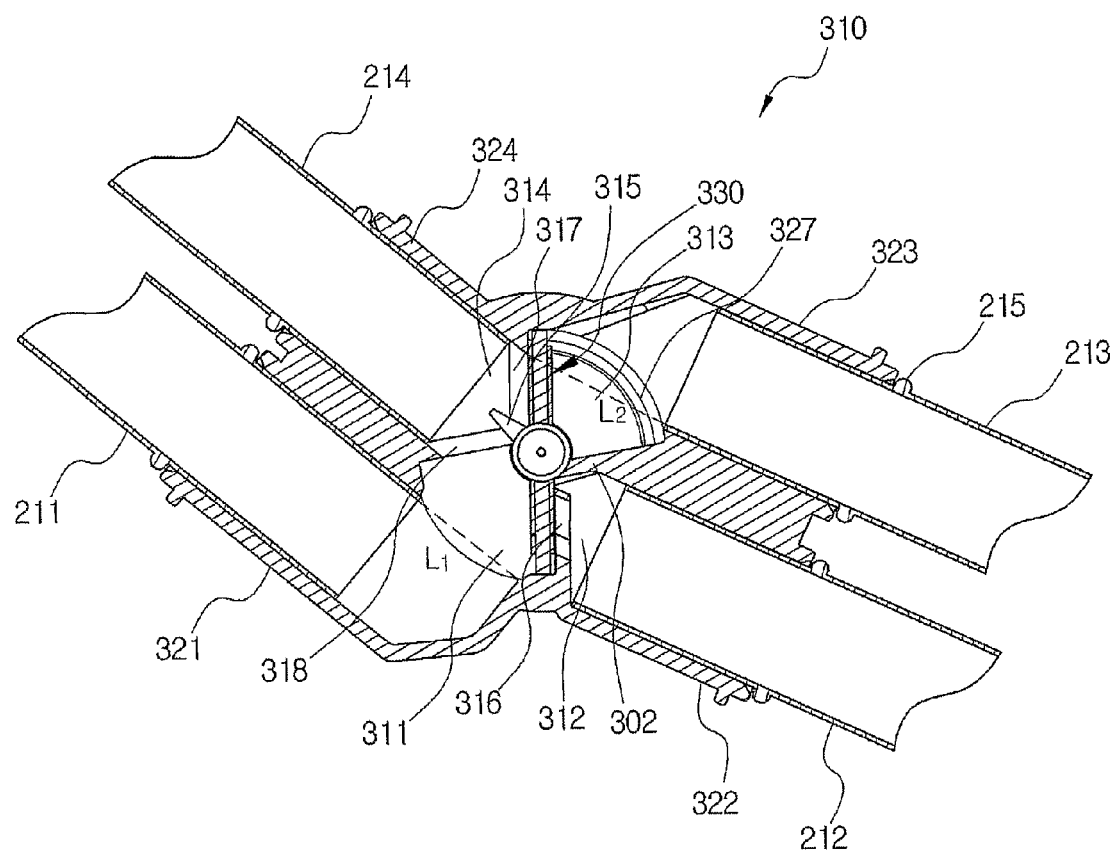
FIG. 9 is a cross-sectional view of the main body of the flow control valve according to the present invention.
Figure 10:
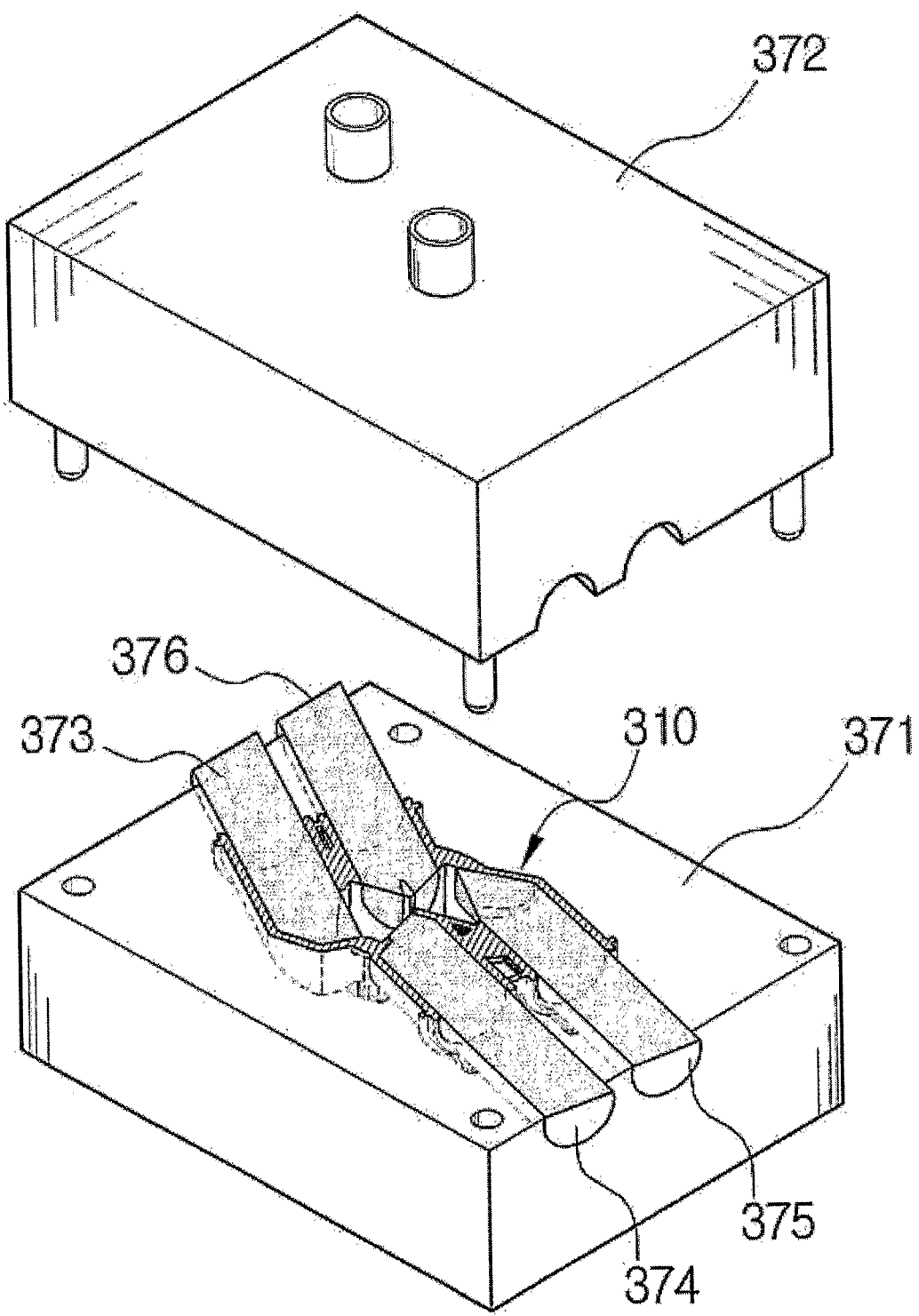
FIG. 10 is a schematic view showing a manufacturing process of the main body.

FIG. 3 is a perspective view of a flow control valve 300 which is disposed at a heat exchange medium receiving portion 200 according to the present invention, FIG. 4 is a perspective view of the flow control valve 300 according to the present invention, FIG. 5 is a cross-sectional view of the flow control valve 300 taken along a line A-A' of FIG. 4, FIG. 6 is an exploded perspective view of the flow control valve 300 of FIG. 4, FIG. 7 is a perspective view, partially cut away, of a main body 310 of the flow control valve 300 according to the present invention, FIG. 8 is a plane view of the main body 310 of the flow control valve 300 according to the present invention, FIG. 9 is a cross-sectional view of the main body 310 of the flow control valve 300 according to the present invention, and FIG. 10 is a schematic view showing a manufacturing process of the main body 310.

The flow control valve 300 of the present invention functions to control an amount of heat exchange medium supplied from a heat exchange medium supplying portion (not shown) to a heat exchange medium receiving portion 200. FIG. 3 shows a case that the heat exchange medium receiving portion 200 is a heater core H. However, the heat exchange medium receiving portion 200 may be a radiator in the air conditioner, in which a high temperature heat exchange medium should be efficiently controlled and supplied. Further, the flow control valve 300 can be applied to various structures in which a specific medium should be efficiently controlled and supplied.

Firstly, the main body 310 constructing a basic body of the flow control valve 300 will be described.

Hereinafter, a first inlet pipe 211 is defined as a pipe for transferring the heat exchange medium from the heat exchange medium supplying portion to the flow control valve 300, a second inlet pipe 212 is defined as a pipe for transferring the heat exchange medium from the flow control valve 300 to the heat exchange medium receiving portion 200, a first outlet pipe 213 is defined as a pipe for transferring the heat exchange medium discharged from the heat exchange medium receiving portion 200 to the flow control valve 300, and a second outlet pipe 214 is defined as a pipe for discharging the heat exchange medium from the flow control valve 300.

The flow control valve 300 of the present invention includes first to fourth ports 321, 322, 323 and 324 which are respectively formed at an outer surface thereof; a main body 310 which is formed with a plurality of partition walls 301, 302, 303 and 304 for partitioning a flowing portion 311, 312, 313, 314 into four spaces which are respectively connected with the first to fourth ports 321, 322, 323 and 324 so that the heat exchange medium can be flowed; and a plate type valve 330 which is formed with a rotational shaft and a pair of door members extended from the rotational shaft so as to be rotated around the rotational shaft and which is rotated at a part of the flowing portion 311, 312, 313, 314 so as to selectively control flow of the heat exchange medium.

Speaking more detailedly, the main body 310 is formed with the first port 321 which is connected with the first inlet pipe 211 of the heat exchange medium supplying portion so that the heat exchange medium can be introduced from the heat exchange medium supplying portion, the second port 322 which is connected with the second inlet pipe 212 of the heat exchange medium receiving portion 200 so that the heat exchange medium can be moved to the heat exchange medium receiving portion 200, the third portion 323 which is connected with the first outlet pipe 213 of the heat exchange medium receiving portion 200 so that the heat exchange medium can be introduced from the heat exchange medium receiving portion 200, and the fourth port 324 which is connected with the second outlet pipe 214 so that the heat exchange medium can be discharged.

In other words, the first to fourth ports 321, 322, 323 and 324 are respectively connected with the first inlet pipe 211 and the second outlet pipe 214 of the heat exchange medium supplying portion and the second inlet port 212 and the first outlet pipe 213 of the heat exchange medium receiving portion 200.

The main body 310 is formed with a first wall 301 which partitions between the first and second ports 321 and 322 and has a first communicating portion 316 for communicating the first and second ports 321 and 322; a second wall 302 which partitions between the second and third ports 322 and 323 and is formed so that the second and third flowing portions 312 and 313 are communicated with each other; a third wall 303 which partitions between the third and fourth ports 323 and 324 and has a second communicating portion 317 for communicating the third and fourth ports 323 and 324; and a fourth wall 304 which partitions between the fourth and first ports 324 and 321 and has a third communicating portion 318 for communicating the fourth and first ports 324 and 321. The second flowing portion 312 is defined by the first wall 301 and the second wall 302, the third flowing portion 313 is defined by the second wall 302 and the third wall 303, the fourth flowing portion 314 is defined by the third wall 303 and the fourth wall 304, and the first flowing portion 311 is defined by the fourth wall 304 and the first wall 301.

In other words, on the basis of a center portion of the main body 310, the first to fourth flowing portions 311, 312, 313 and 314, through which the heat exchange medium is flowed, are partitioned by the first to fourth walls 301, 302, 303 and 304. The first to fourth walls 301 to 304 have the communicating portions 316, 317 and 318 except the second wall 302 which partitions between the second flowing portion 312 and the third flowing portion 313.

At this time, the first communicating portion 316 is defined as a hollowed portion of the first wall 301 which communicates the first and second flowing portions 311 and 312, the second communicating portion 317 is defined as a hollowed portion of the third wall 303 which communicated the third and fourth flowing portions 313 and 314, and the third communicating portion 318 is defined as a hollowed portion of the fourth wall 304 which communicates the fourth and first flowing portions 314 and 311.

Each of the communicating portions 316, 317 and 318 formed at the first wall 301, third wall 303 and the fourth wall 304 has to be closed when being contacted with the plate type valve 330.

Preferably, at a center portion of the main body 310, there is formed a central shaft supporting portion 326 which supports the rotational shaft of the plate type valve 330 and contacts with the rotational shaft to prevent the heat exchange medium from being flowed among the flowing portions 311, 312, 313 and 314.

The first port 321 is formed at a center portion of an outer circumference of the first flowing portion 311 so that an amount of the heat transfer medium which is bypassed or introduced into the heat exchange medium receiving portion 200 can be facilely controlled by rotation of the plate type valve 330.

More detailedly, in the flow control valve 300 of the present invention, when the plate type valve 330 is positioned at a middle portion of the first flowing portion 311 and the third flowing portion 313 (referring to FIG. 13), a connecting portion of the first port 321 and the first flowing portion 311 is divided into two sections having the same surface area, and thus the heat exchange medium introduced through the first inlet pipe 211 and the first port 321 can be equally transferred to the heat exchange medium receiving portion 200 and the second outlet pipe 214, whereby it is possible to facilely control the flowing amount of the heat exchange medium by the rotation of the plate type valve 330.

Further, in the flow control valve 300, the third port 323 is formed at a center portion of an outer circumference of the third flowing portion 313. Therefore, when the plate type valve 330 is positioned at a center portion of the first flowing portion 311 and the third flowing portion 313, a connecting portion of the third port 323 and the third flowing portion 313 is divided into two sections having the same surface area, and thus the amount of the heat exchange medium which is discharged from or introduced into the heat exchange medium receiving portion 200 can be facilely controlled.

Furthermore, in the flow control valve 300 of the present invention, since each space of the second flowing portion 312 and the third flowing portion 313 is closed by the second wall 302, it is completely prevented that the heat exchange medium which is introduced through the first inlet pipe 211 and the first port 321 and then transferred to the second flowing portion 312 is flowed backward to the third flowing portion 313. Thus, the heat exchange medium (except the bypassed amount) divided by the rotation of the plate type valve 330 can be wholly transferred to the heat exchange medium receiving portion 200.

Meanwhile, the constructions of the main body 310, i.e., the ports 321, 322, 323 and 324 which are connected with the pipes 211, 212, 213 and 214, the walls 301, 302, 303 and 304 which partitions the flowing portions 311, 312, 313 and 314, and the communicating portions 316, 317 and 318 which are defined by the walls 301, 302, 303 and 304 can be integrally formed by using a lower mold 371, an upper mold 372 and each core 373, 374, 375, 376. The main body 310 is formed by the lower mold 371, the upper mold 372 which forms the first and third flowing portions 311 and 313, the first core 373 which forms the first port 321 and contacts with a part of the upper mold 372 forming the first flowing portion 311 so that the first port 321 and the first flowing portion 311 form a continuous flowing path, the second core 374 which forms the second port 322 and the second flowing portion 312, the third core 375 which forms the third port 323 and contacts with a part of the upper mold 372 forming the third flowing portion 313 so that the third port 323 and the third flowing portion 313 form a continuous flowing path, and the fourth core 376 which forms the fourth port 324 and the fourth flowing portion 314.

The first core 373 forming the first port 321 and the third core 373 forming the third port 323 are respectively contacted with portions forming the first flowing portion 311 and the second flowing portion 312 of the upper mold 372, so that an extended line L1 (a portion that the first core 373 is inserted so as to communicate the first flowing portion 311 and the first port 321) adjacent to the central shaft supporting portion 326 of an inner surface of the first port 321 is formed at a more inner side than an outer circumference of the first flowing portion 311, and an extended line L2 (a portion that the third core 375 allows to communicate the third flowing portion 313 and the third port 323) adjacent to the central shaft supporting portion 326 of an inner surface of the third port 323 is formed at a more inner side than an outer circumference of the third flowing portion 313, when viewing the main body 310 from an upper side (referring to FIG. 9).

Therefore, since the external constructions of the main body 310 as well as the ports 321, 322, 323 and 324 and the flowing portions 311, 312, 313 and 314 through which the heat exchange medium is flowed, and the portions for connecting the ports the ports 321, 322, 323 and 324 and the flowing portions 311, 312, 313 and 314 can be formed only by using the upper mold 372, the lower mold 371 and the cores 373, 374, 375 and 376, it is possible to facilely manufacture the flow control valve and also increase productivity.

The portion that forms the first flowing portion 311 of the upper mold 372 is formed to be contacted with the first core 373, the second core 374 and the fourth core 376, and the portion that forms the third flowing portion 313 of the upper mold 372 is formed to be contacted with the third core 375 and the fourth core 376, so that the heat exchange medium can be flowed through the ports 321, 322, 323 and 324 and the flowing portions 311, 312, 313 and 314. The second core 374 forms the second port 322, the second flowing portion 312 and first communicating portion 316 (a portion that communicates the first flowing portion 311 and the second flowing portion 312 of the first wall 301). The fourth core 376 forms the fourth port 324, the fourth flowing portion 314, the second communicating portion 317 (a portion that communicates the third flowing portion 313 and the fourth flowing portion 314 of the third wall 303) and the third communicating portion 318 (a portion that communicates the fourth flowing portion 314 and the first flowing portion 311 of the fourth wall 304). Therefore, the heat exchange medium can be flowed.

At this time, a portion forming the third flowing portion 313 of the upper mold 372 is formed to be not contacted with the second core 374 so that the second wall 302 is formed. Therefore, the second flowing portion 312 and the third flowing portion 313 are formed to be not communicated with each other.

The third flowing portion 313 is a space in which the heat exchange medium flowing through the heat exchange medium receiving portion 200 is introduced and then moved to the fourth flowing 314 so as to be discharged. In case that the second flowing portion 312 and the third flowing portion 313 are communicated with each other, the heat exchange medium flowing through the heat exchange medium receiving portion 200 may be flowed backward to the second flowing portion 312 and the heat exchange medium receiving portion 200. Therefore, in the flow control valve 300 of the present invention, the possibility of occurring the backflow of the heat exchange medium is completely prevented by closing between the second flowing portion 312 and the third flowing portion 313.

Preferably, in the main body 310 of the flow control valve 300 of the present invention, the first and fourth ports 321 and 324 for fixing the first inlet pipe 211 and the second outlet pipe 214 of the heat exchange medium supplying portion are disposed to be parallel with each other, and the second and third ports 322 and 323 for fixing the second inlet pipe 212 and the first outlet pipe 213 of the heat exchange medium receiving portion 200 are also disposed to be parallel with each other, whereby they can be facilely assembled with each other.

In order to prevent the heat exchange medium flowed from the first flowing portion 311 or the third flowing portion 313 and discharged to the second outlet pipe 214 from being flowed backward to the first and third flowing portions 311 and 313, a protrusion 315 is formed to be protruded from the central shaft supporting portion 326 to the fourth flowing portion 314. To this end, the fourth core 376 is formed with a concaved portion corresponding to the protrusion 315, and the concaved portion is formed at an end of the fourth core 36, which is inserted inside the main body 310.

As shown in FIG. 9, both sides of the protrusion 315 have a desired angle so that the heat exchange medium can be smoothly flowed from the first flowing portion 311 or the third flowing portion 313 to the fourth flowing portion 314.

In other words, in the flow control valve 300 of the present invention, it is possible to facilely control the introduced amount of the heat exchange medium. Further, since it is possible to prevent the backflow of the heat exchange medium discharged or introduced into the heat exchange medium receiving portion 200, the amount of the heat exchange medium can be precisely controlled. Thus since the internal temperature of the vehicle can be facilely controlled, it is possible to provide a temperature comfortable to a user.

In addition, at each end of the ports 321, 322, 323 and 324, there is formed a fixing portion 325 for fixing a bead 215 formed to be protruded outside on an outer surface of each of the first inlet pipe 211, the second inlet pipe 212, the first outlet pipe 213 and the second outlet pipe 214 which are respectively connected to the ports 321, 322, 323 and 324, and thus it is further facile to couple the pipes 211, 212, 213 and 214 with the ports 321, 322, 323 and 324. The fixing portion 325 may be integrally formed with the main body 310 or separately provided.

The plate type valve 330 is rotated around the central shaft supporting portion 326 within the first and third flowing portions 311 and 313 so as to control the amount of the heat exchange medium introduced through the first inlet pipe 211 and the first port 321 into the first flowing portion 311, which is introduced through the second flowing portion 312, the second port 322 and the second inlet pipe 212 into the heat exchange medium receiving portion 200 or bypassed through the fourth flowing portion 314, the fourth port 324 and the second outlet pipe 214.

The flow of the heat exchange medium according to a position of the plate type valve 330 will be described below with reference to FIGS. 14, 12a and 13a.

The plate type valve 330 is connected with a driving means 400. Thus, the plate type valve 330 can precisely control the amount of the heat exchange medium introduced into the heat exchange medium receiving portion 200 or bypassed without passing through the heat exchange medium receiving portion 200.

At the time of a maximum air-conditioning load and a maximum heating load, the plate type valve 330 is contacted with the first to fourth walls 301, 302, 303 and 304 that partitions the first to fourth flowing portions 311, 312, 313 and 314 so as to close the first communicating portion 316, the second communicating portion 317 or the third communicating portion 318 and thus control the flow of the heat exchange medium. The first to fourth walls 301, 302, 303 and 304 are formed to be extended from the central shaft supporting portion 326 to a vertical direction of the main body 310 and a radial direction so that the plate type valve 330 is closely contacted with the first wall 301 to the fourth wall 304. Preferably, a second sealing member 331 is further provided at a portion of the plate type valve 330, which is contacted with the first wall 301 to the fourth wall 304, so that the plate type valve 330 can be further closed contacted with the walls 301, 302, 303 and 304 so as to prevent a leakage of the heat exchange medium. A ring member 360 may be also provided at an upper portion of the plate type valve 330 so as to facilitate the rotation of the plate type valve 330.

The ring member 360 may be formed of a material like Teflon or any other material which can be disposed at the upper portion of the plate type valve 330 so as to facilitate the rotation of the plate type valve 330.

In a conventional circular ball valve, there is a disadvantage in that it has a large volume and also it is difficult to operate the circular ball valve in case that it is deformed by a high temperature heat exchange medium. However, in the flow control valve 300 of the present invention, since the plate type valve 330 has a small volume, it is possible to form a sufficient space in which a larger amount of the heat exchange medium can be smoothly flowed, and thus it is possible to reduce the risk of the deformation due to the high temperature heat exchange medium. Although the deformation is occurred, it is prevented that driving force for operating the plate type valve 330 is rapidly increased, and thus it is possible to facilely control the amount of the heat exchange medium.

Further, in the flow control valve 300 of the present invention, since an upper surface of the main body 310 is opened so that the plate type valve 330 can be inserted into the space of the first and third flowing portions 311 and 313, the assembling ability of the plate type valve 330 can be enhanced. And since upper surfaces of the second flowing portion 312 and the fourth flowing portion 314, in which the plate type valve 330 is not rotated, are closed, the possibility of leak the heat exchange medium is minimized.

At this time, a shape of the upper surface of the main body 310 can be controlled to be opened or closed by controlling a shape of the upper mold 372.

A cover 340 is provided to seal an opened area of the upper surface of the main body 310 and also fix the plate type valve 330. FIG. 6 shows an example in which the cover 340 is coupled to the upper portion of the main body 310 by a separate fastening means.

According to the flow control valve 300, a first sealing member 350 is further provided between the main body 310 and the cover 340 so that the heat exchange medium flowed in the main body 310 is not leaked to an outside.

And each communicating portion 316, 317, 318 is selectively opened and closed by the rotation of the flow control valve 300. A valve seating portion 327 is formed to be protruded at a lower surface of the first flowing portion 311 or the third flowing portion 313 in order to prevent the plate type valve 330, which controls the amount of the heat exchange medium bypassed or introduced into the heat exchange medium receiving portion 200, from being erroneously assembled. A corresponding portion 332 which is correspondent to the valve seating portion 327 of the main body 310 is formed at a part of the plate type valve 330.

The valve seating portion 327 has to be configured so that movement of the plate type valve 330 is not interfered and thus the essential function of the plate type valve 330, which controls the flow of the heat exchange medium, is not prevented. For example, as shown in FIG. 5, the valve seating portion 327 is formed to be protruded along a lower circumference of the first flowing portion 311 or the third flowing portion 313, and as shown in FIG. 6, the corresponding portion 332 of the plate type valve 330 is formed to be tapered corresponding to the valve seating portion 327.

The drawing shows an example in which the valve seating portion 327 is formed at the third flowing portion 313.

In other words, in the flow control valve 300 of the present invention, the valve seating portion 327 is formed at only a part of the first flowing portion 311 or the third flowing portion 313 in which the plate type valve 330 is provided, and the corresponding portion 332 is formed to be correspondent to the valve seating portion 327 at only a part of the plate type valve 330. Therefore, only in case that the corresponding portion 332 is correspondent to the valve seating portion 327, the cover 340 can be assembled with the main body 310. When the plate type valve 330 is erroneously assembled, the plate type valve 330 is protruded by the protruded region of the valve seating portion 327 and thus the assembling process cannot be performed.

In case that the valve seating portion 327 is formed at the main body 310, but the corresponding portion 332 is not formed at the plate type valve 330, even through the plate type valve 330 is erroneously disposed, it was difficult to recognize the erroneous assembling of the plate type valve 330 until the flow control valve 300 is operated, and thus there was inconvenience that they should be assembled again. However, according to the flow control valve 300 of the present invention, when the plate type valve 330 is erroneously disposed, the assembling process itself cannot be performed, and thus the erroneous assembling is previously prevented before installation of the flow control valve 300.

Figure 11:
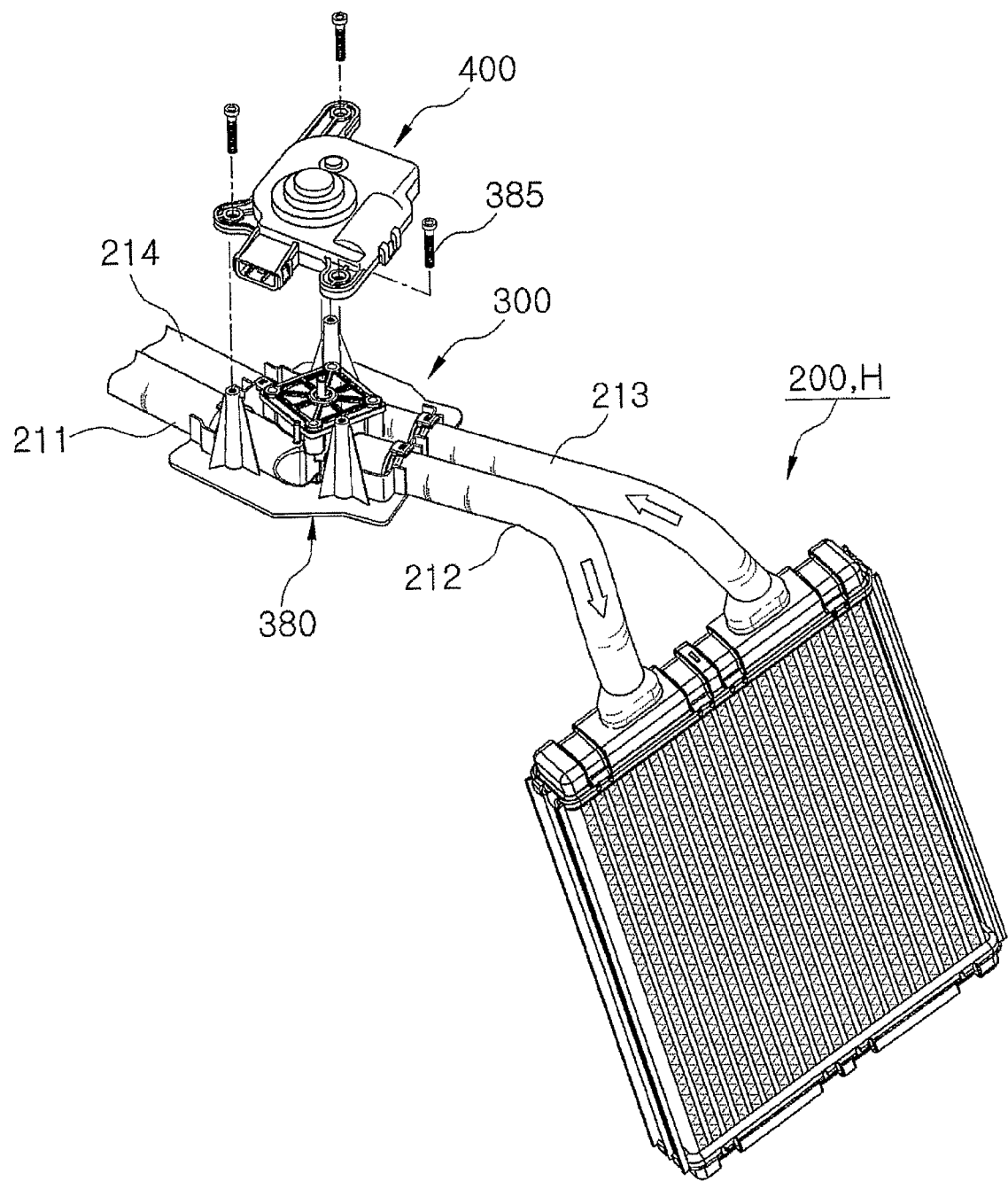
FIG. 11 is other perspective view showing that the flow control valve which is disposed at the heat exchange medium receiving portion according to the present invention.
Figure 12:
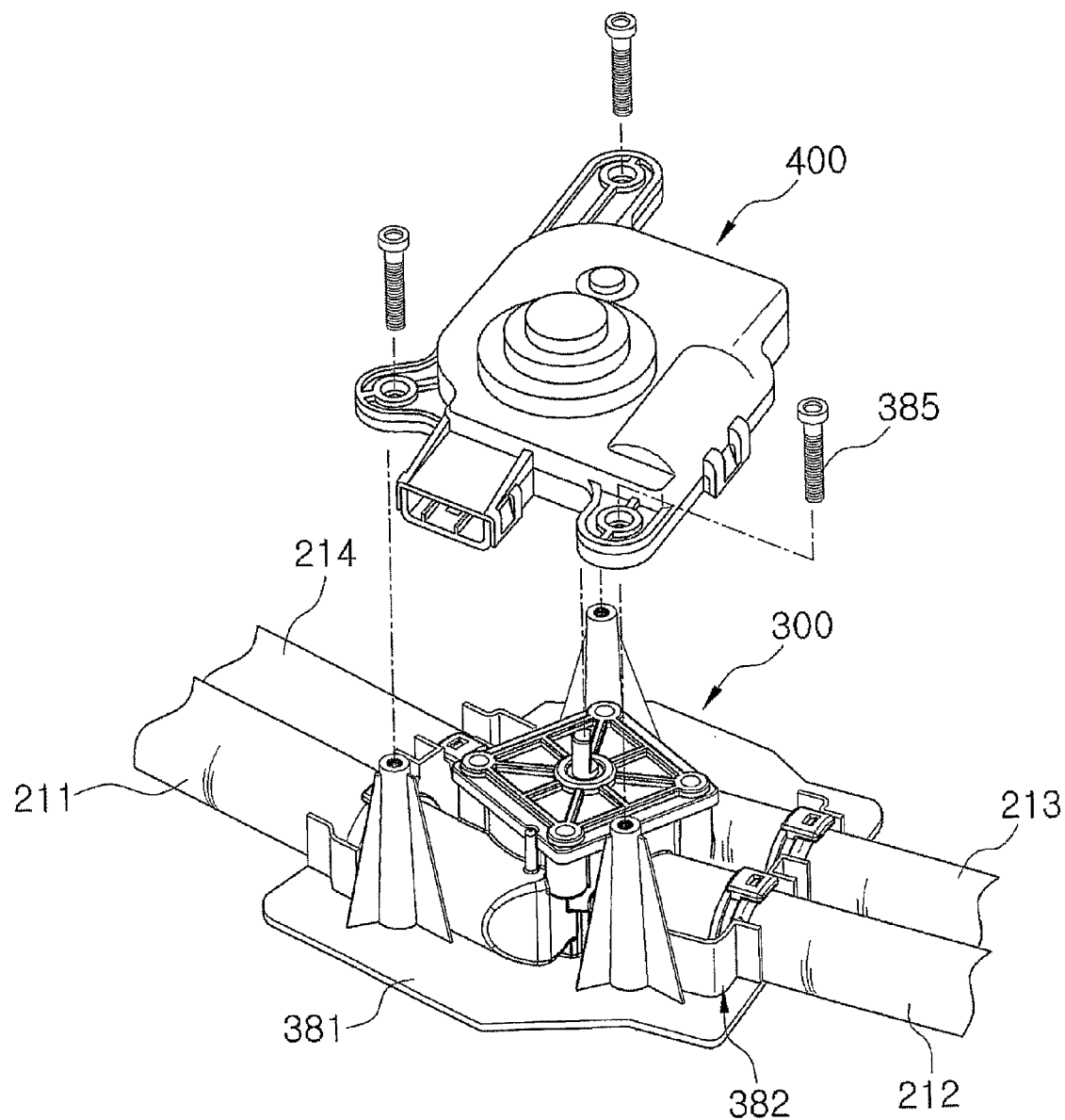
FIG. 12 is a perspective view of a case of the flow control valve according to an embodiment of the present invention.
Figure 13:
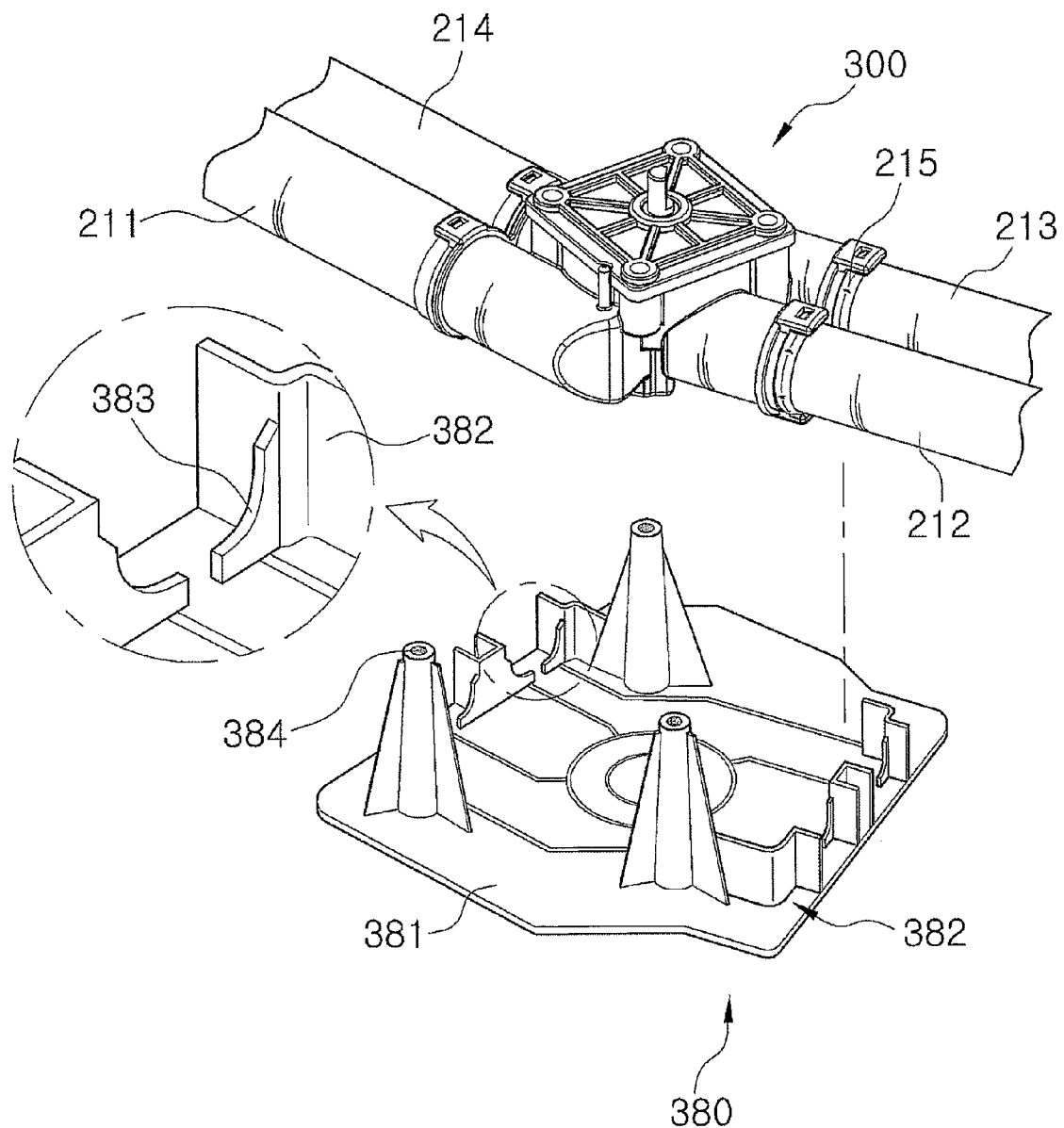
FIG. 13 is an exploded perspective view of the case of the flow control valve of FIG. 12.

FIG. 11 is other perspective view showing that the flow control valve 300 which is disposed at the heat exchange medium receiving part 200 according to the present invention, FIG. 12 is a perspective view of a case 380 of the flow control valve 300 according to an embodiment of the present invention, and FIG. 13 is an exploded perspective view of the case 380 of the flow control valve 300 of FIG. 12.

As shown in FIGS. 11 to 13, the flow control valve 300 of the present invention can further include the case 380 for preventing separation of the first inlet pipe 211, the second inlet pipe 212, the first outlet pipe 213 and the second outlet pipe 214 when coupling the pipes 211, 212, 213 and 214.

The case 380 includes a plane portion 381 which is closely contacted with a lower surface of the main body 310, and a supporting portion 382 which is vertically protruded at the plane portion 381 to fix the bead 215. In the flow control valve 300 of the present invention, as the case 380 is provided, the pipes 211, 212, 213 and 214 are primarily fixed through the fixing portion 325 formed at the end of each port 321, 322, 323, 324, and then secondly fixed by the supporting portion 382 of the case 380. Therefore, the separation of the pipes 211, 212, 213 and 214 can be previously prevented.

In addition, the case 380 is formed with a U-shaped mounting portion 383 formed at a portion that is contacted with an outer surface of the first inlet pipe 211, the second inlet pipe 212, the first outlet pipe 213 or the second outlet pipe 214 (i.e., a portion that is contacted with a surface perpendicular to a length direction of the pipes 211, 212, 213 and 214), so that the pipes 211, 212, 213 and 214 can be stably fixed.

At this time, in order to prevent the separation of the case 380, the supporting portion 382 may be formed with a coupling portion 384 which is coupled to the driving means 400 by a separate fixing means 385.

While the driving means 400 is disposed between the supporting portion 382 and the fixing means 385, the case 380 and the fixing means 385 can be fixed by fastening the coupling portion 384 and the fixing means 385.

In the drawings, for example, the driving means 400 is an actuator which is connected with the flow control valve 300 of the present invention. Various means which can be fixed to the coupling portion 384 so as to control the rotation of the plate type valve 330 can be also used.

Further, in case that the driving means 400 is spaced apart from the upper surface of the flow control valve 300, the flow control valve 300 can be provided with a separate cover for covering the case 380 so as to fix the case 380. Besides, various means which can fixedly and closely contact the case 380 to the flow control valve 300 can be also applied.

Figure 14:
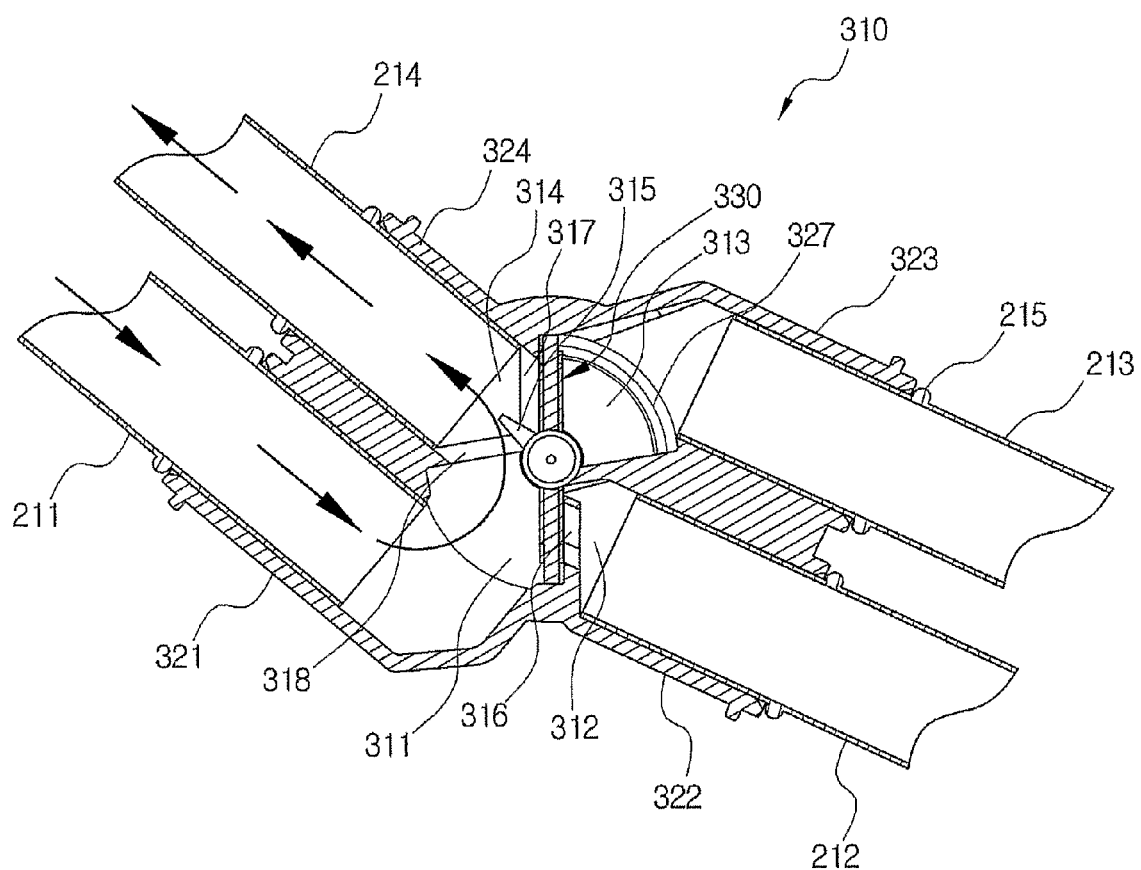
FIGS. 14 and 15 are views the flow control valve and the air conditioner at the time of a maximum air-conditioning load.
Figure 15:
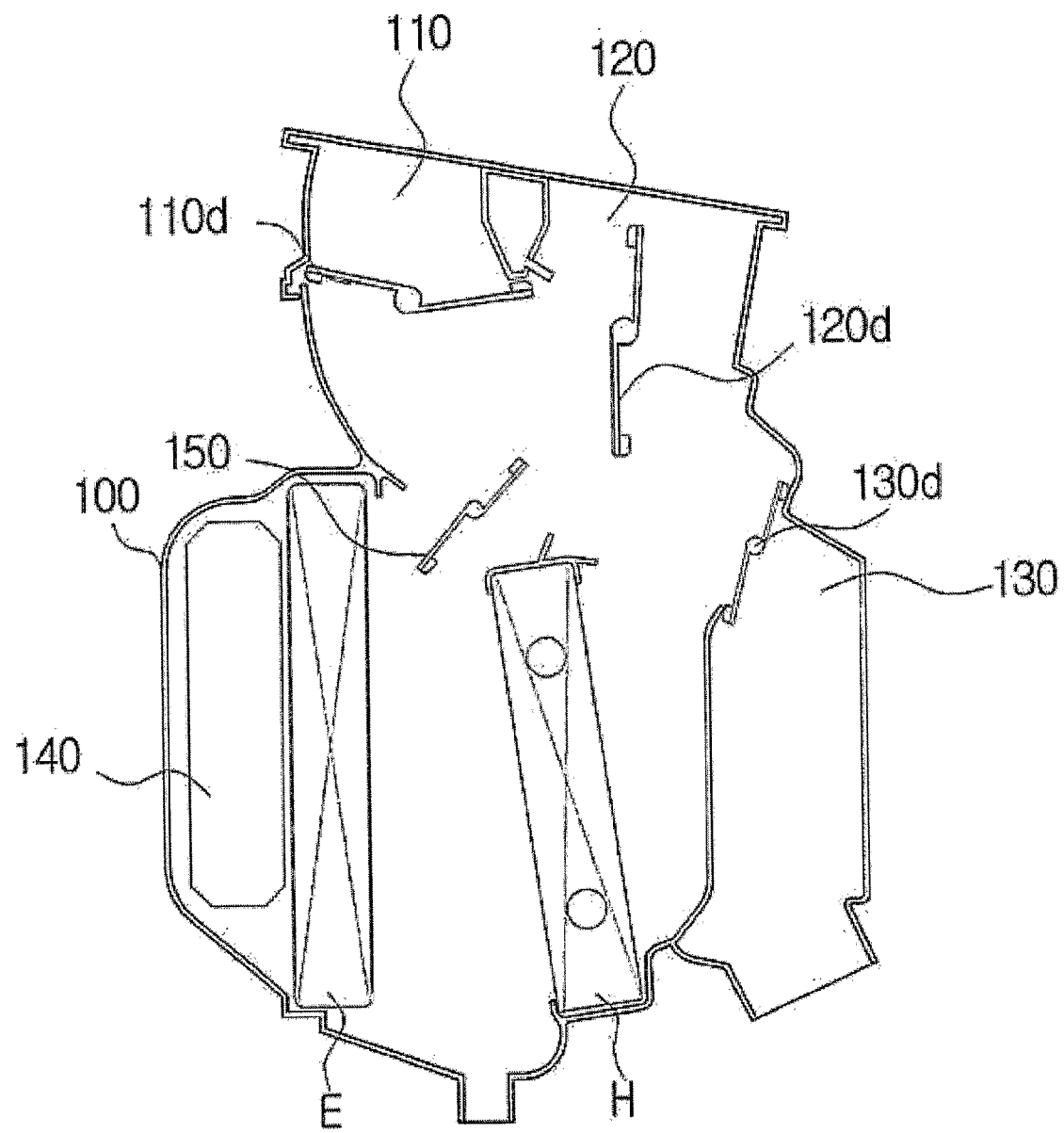
Figure 16:
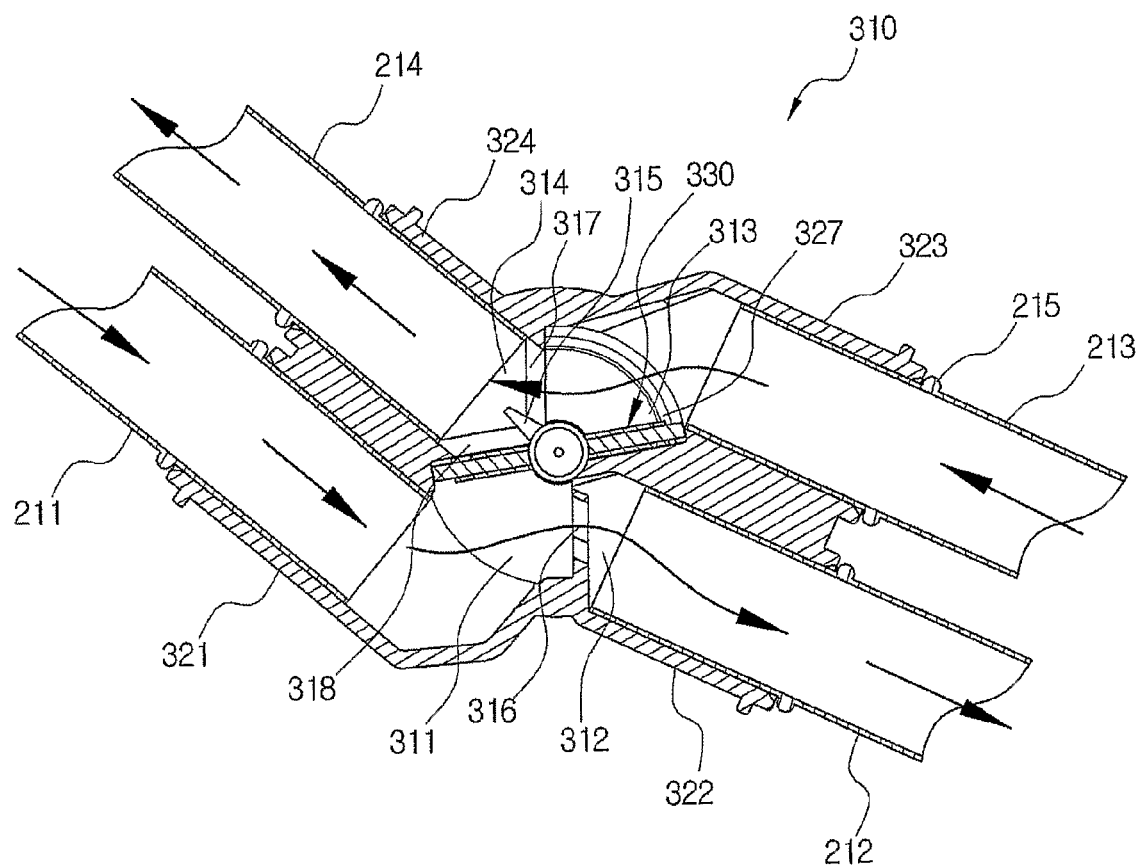
FIGS. 16 and 17 are views the flow control valve and the air conditioner at the time of a maximum heating load.
Figure 17:
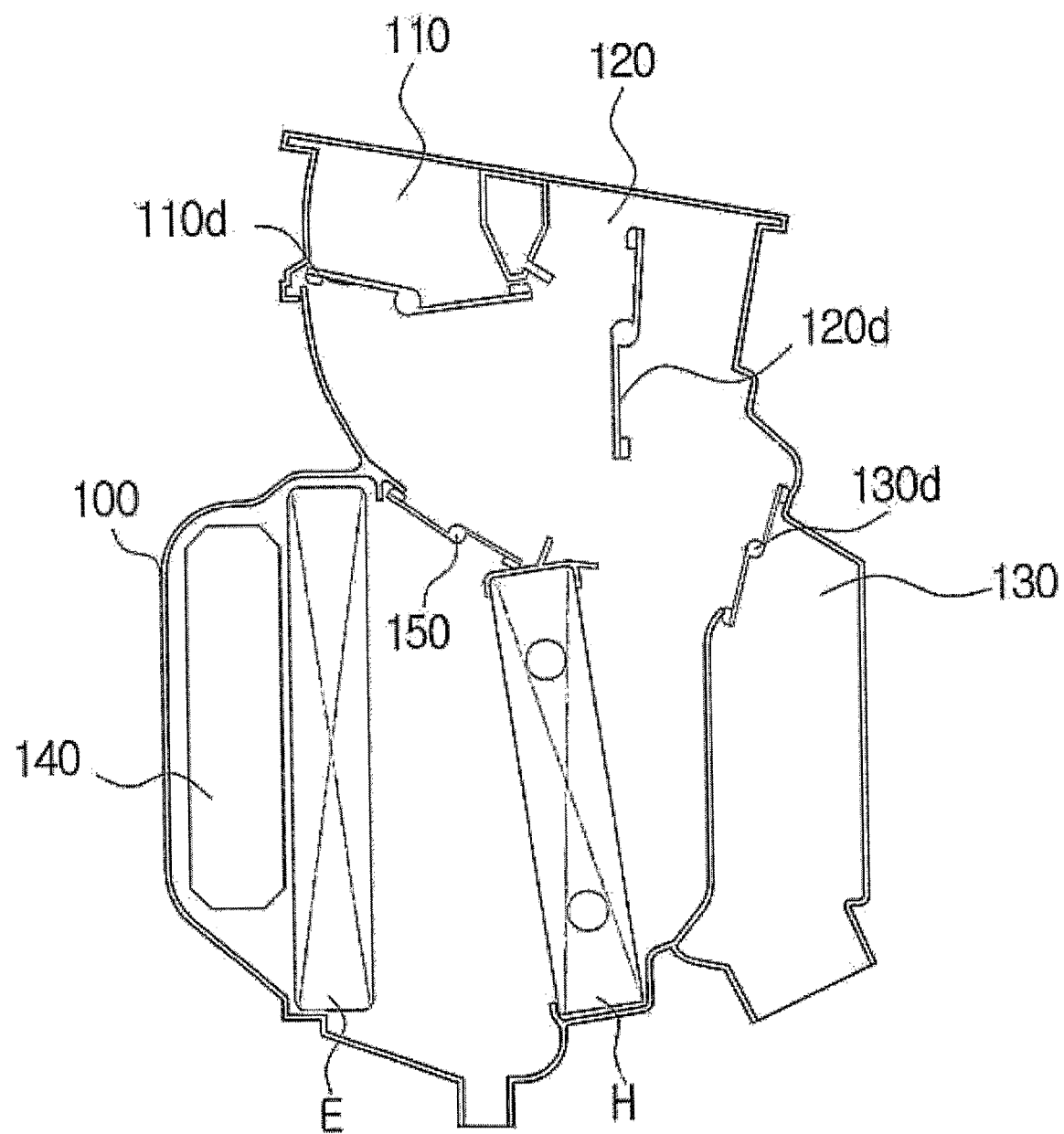
Figure 18:
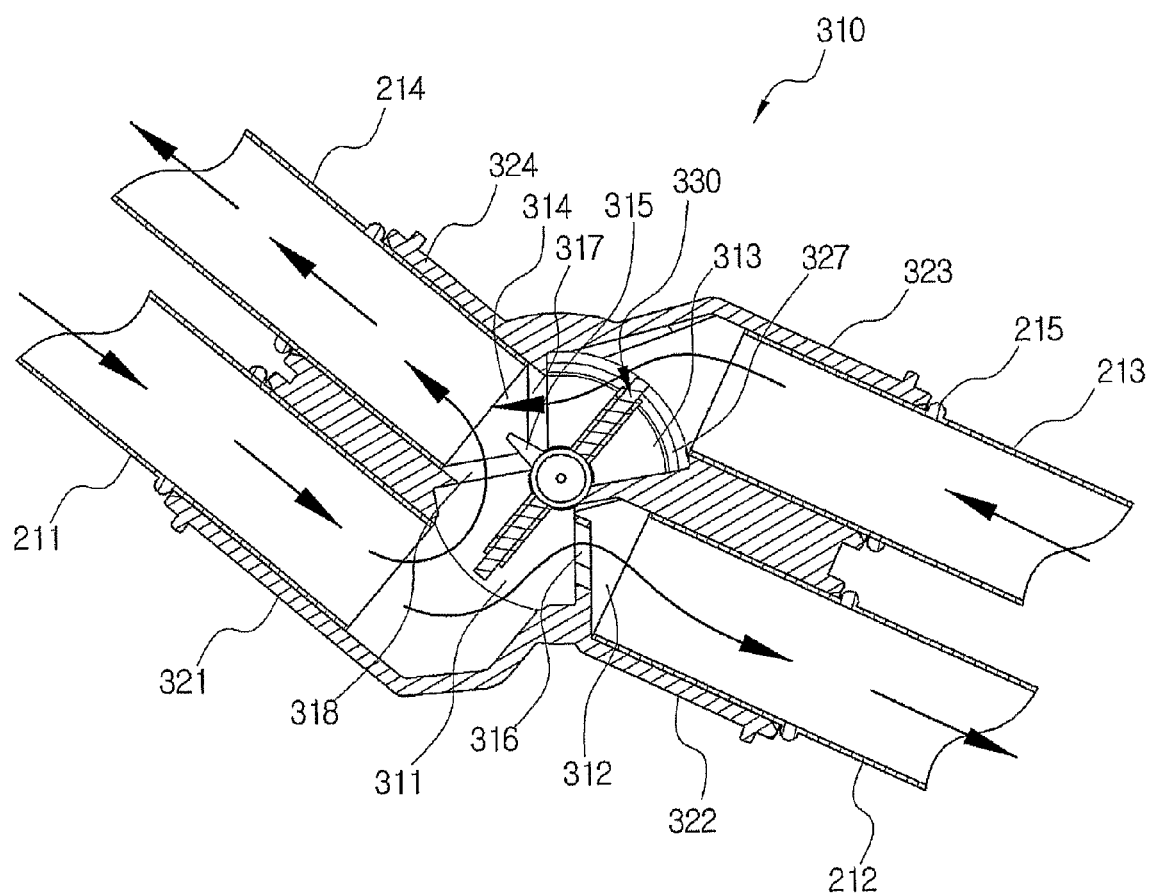
FIG. 18 is a view of the flow control valve according to an embodiment of the present invention.

FIGS. 14 and 15 are views the flow control valve 300 and the air conditioner 1000 at the time of a maximum air-conditioning load, FIGS. 16 and 17 are views the flow control valve 300 and the air conditioner 1000 at the time of a maximum heating load, and FIG. 18 is a view of the flow control valve 300 according to an embodiment of the present invention.

As shown in FIGS. 15 and 17, the air conditioner 1000 of the present invention includes an air-conditioning case 100 formed with a vent of which an opening degree is controlled by a door; an evaporator E which is provided in the air-conditioning case 100; a heater core H which is provided in the air-conditioning case 100 and provided with the flow control valve 300 having the above-mentioned characteristic; and a subsidiary door 150 of which an opening degree is controlled so as to control an air amount bypassing the heater core H. The driving means 400 of the flow control valve 300 is connected with the subsidiary door 150 to interlockingly drive the subsidiary door 150 with the flow control valve 300. The air conditioner 1000 is provided with a ventilator 140 which is connected with an air inlet port of the air-conditioning case 100 so as to ventilate external air. When the air ventilated by the ventilator and passed through the evaporator E is passed through the heater core H, a part of the air is controlled by the subsidiary door 150.

FIGS. 14 and 15 are views at the times of a maximum air-conditioning load. As shown in FIG. 14, in the flow control valve 300, the plate type valve 330 closes the first communicating portion 316 of the first wall 301 and the second communicating portion 317 of the third wall 303 so that the high temperature heat exchange medium is not introduced into the heater core H. Therefore, the whole amount of the heat exchange medium introduced through the first port 321 into the first flowing portion 311 is passed through the third communicating portion 318 of the fourth wall 304, the fourth flowing portion 314 and the fourth port 324 and then discharged through the second outlet pipe 214.

At this time, as shown in FIG. 5, the subsidiary door 150 interlocked with the driving means 400 is opened so that a part of the air passed through the evaporator E is directly passed without passing through the heater core H.

FIGS. 16 and 17 are views at the times of a maximum air-conditioning load. As shown in FIG. 16, in the flow control valve 300, the plate type valve 330 closes the third communicating portion 318 of the fourth wall 304 so that the whole amount of the high temperature heat exchange medium is flowed into the heater core H. Therefore, the heat exchange medium introduced through the first inlet pipe 211 and the first port 321 into the first flowing portion 311 is passed through the first communicating potion 316, the second flowing portion 312 and the second port 322 and then flowed into the heater core H through the second inlet pipe 212.

In the automobile air conditioner 100 of the present invention, since the second wall 302 which partitions between the second port 322 and the third port 323 is blocked, it is completely prevented that the heat exchange medium to be introduced into the heater core H is flowed again into the third flowing portion 313, or the heat exchange medium flowed from the heater core H is flowed backward to the second flowing portion 312, the heater core H or the first flowing portion 311. The flow of the heat exchange medium can be facilely controlled by using the plate type valve 330.

The heat exchange medium flowed from the heater core H is passed through the first output pipe 213, the third port 323, the third flowing portion 313 and the second communicating portion 317, and flowed to the fourth flowing portion 314, and passed through the fourth port 324, and then discharged through the second outlet pipe 213.

As shown in FIG. 17, the subsidiary door 150 is closed so that the whole amount of the air passed through the evaporator E is passed through the heater core H.

In other words, in the air conditioner 1000 of the present invention, the flow control valve 300 is provided at the heater core H so as to control the amount of the heat exchange medium introduced into the heater core H. The subsidiary door 150 is interlocked with the driving means 400 of the flow control valve 300 so that the temperature can be constantly changed according to the user's setting. Therefore, it is facile to control the temperature and it is possible to enhance the air-conditioning and heating efficiency.

FIG. 18 is a view showing a middle temperature setting state (i.e., a middle state between the maximum air-conditioning load and the maximum heating load). The plate type valve 330 is positioned at a middle place between the first and third flowing portions 311 and 313. Therefore, a part of the heat exchange medium introduced through the first inlet pipe 211 into the first flowing portion 311 is passed through the first communicating portion 316, the second flowing portion 312 and the second port 322 and then flowed to the heater core H through the second inlet pipe 212, and other part is passed through the third communicating portion 318, the fourth flowing portion 314 and the fourth port 324 and then discharged through the second inlet pipe 212.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

According to the flow control valve and the air conditioner for an automobile equipped with the same of the present invention, since it is possible to reduce the risk of deformation due to the high temperature heat exchange medium by using the plate type valve, the durability is increased. Also it is possible to efficiently control an amount of the heat exchange medium by increasing sealing ability.

Further, according to the air conditioner for an automobile equipped with the same of the present invention, since it is facile to control the supplied amount of the heat exchange medium, it is possible to efficiently control the internal temperature of the automobile. And since the temp door is not necessary, it is possible to efficiently utilize a space of an engine room. Also it is possible to provide a temperature comfortable to a user by increasing the air-conditioning and heating efficiency of the air conditioner.

The invention claimed is:

1. A flow control valve, comprising:
a main body (310) comprising a plurality of partition walls (301, 302, 303 and 304) configured to partition a flowing portion into first to fourth flowing portions (311, 312, 313, 314) which are respectively connected with first to fourth ports (321, 322, 323 and 324) such that a heat exchange medium is flowed;
a plate type valve (330) comprising a rotational shaft and a pair of door members extended from the rotational shaft and rotatable around the rotational shaft within the flowing portion (311, 312, 313, 314) so as to selectively control flow of the heat exchange medium;
a central shaft supporting portion (326) formed at a center portion of the main body (310); and
a protrusion (315) extending from the central shaft supporting portion (326) to the fourth flowing portion (314), the protrusion (315) having an orientation independent of rotational positioning of the plate type valve (330) and a shape configured to prevent the heat exchange medium flowed from the first flowing portion (311) or the third flowing portion (313) into the fourth flowing portion (314) from flowing backward to the first and third flowing portions (311 and 313).

2. The flow control valve according to claim 1, wherein the first port (321) is connected with a first inlet pipe (211) of a heat exchange medium supplying portion such that the heat exchange medium is introduced from the heat exchange medium supplying portion, the second port (322) is connected with a second inlet pipe (212) of a heat exchange medium receiving portion (200) such that the heat exchange medium is flowed to the heat exchange medium receiving portion (200), the third port (323) is connected with a first outlet pipe (213) of the heat exchange medium receiving portion (200) such that the heat exchange medium discharged from the heat exchange medium receiving portion (200) is introduced, and the fourth port (324) is connected with a second outlet pipe (214) such that the heat exchange medium is discharged.

3. The flow control valve according to claim 2, wherein the plate type valve (330) is rotatable within a space of the first flowing portion (311) and the third flowing portion (313) so as to control an amount of the heat exchange medium introduced through the first inlet pipe (211) into the main body (310), which is introduced through the second inlet pipe (212) into the heat exchange medium receiving portion (200) and bypassed through the second outlet pipe (214).

4. The flow control valve according to claim 2, wherein the main body (310) comprises a first wall (301) which partitions between the first and second ports (321 and 322), a second wall (302) which partitions between the second and third ports (322 and 323), a third wall (303) which partitions between the third and fourth ports (323 and 324), and a fourth wall (304) which partitions between the fourth and first ports (324 and 321), and
the second flowing portion (312) is defined by the first and second walls (301 and 302), the third flowing portion (313) is defined by the second and third walls (302 and 303), the fourth flowing portion (314) is defined by the third and fourth walls (303 and 304), and the first flowing portion (311) is defined by the fourth and first walls (304 and 301).

5. The flow control valve according to claim 4, wherein the first wall (301) comprises a first communicating portion (316) for communicating the first and second flowing portions (311 and 312), the third wall (303) comprises a second communicating portion (317) for communicating the third and fourth flowing portions (313 and 314), the fourth wall (304) comprises a third communicating portion (318) for communicating the fourth and first flowing portions (314 and 311), and the second wall (302) is formed such that the second and third flowing portions (312 and 313) are not communicated with each other.

6. The flow control valve according to claim 1, wherein the central shaft supporting portion (326) supports the rotational shaft of the plate type valve (330) and contacts with the rotational shaft to prevent the heat exchange medium from being flowed among the flowing portions (311, 312, 313 and 314).

7. The flow control valve according to claim 6, wherein an extended line (L1) adjacent to the central shaft supporting portion (326) of an inner surface of the first port (321) is formed at a more inner side than an outer circumference of the first flowing portion (311), and an extended line (L2) adjacent to the central shaft supporting portion (326) of an inner surface of the third port (323) is formed at a more inner side than an outer circumference of the third flowing portion (313), when viewing the main body (310) from an upper side.

8. The flow control valve according to claim 7, wherein the main body 310 is formed by a lower mold 371, an upper mold 372 which forms the first and third flowing portions 311 and 313, a first core 373 which forms the first port 321 and contacts with a part of the upper mold 372 forming the first flowing portion 311 so that the first port 321 and the first flowing portion 311 form a continuous flowing path, a second core 374 which forms the second port 322 and the second flowing portion 312, a third core 375 which forms the third port 323 and contacts with a part of the upper mold 372 forming the third flowing portion 313 so that the third port 323 and the third flowing portion 313 form a continuous flowing path, and a fourth core 376 which forms the fourth port 324 and the fourth flowing portion 314.

9. The flow control valve according to claim 1, wherein the first port (321) and the fourth port (324) are formed to be parallel with each other, and the second port (322) and the third port (323) are formed to be parallel with each other.

10. The flow control valve according to claim 1, wherein an upper surface of the main body (310) is open such that the plate type valve (330) is capable of being inserted into the space of the first and third flowing portions (311 and 313) from an upper side, and an upper surface of each of the second and fourth flowing portions (312 and 314) in which the plate type valve (330) is not rotated is closed.

11. The flow control valve according to claim 10, further comprising a cover (340) configured to seal an open area of the upper surface of the main body (310) and fix the plate type valve (330).

12. The flow control valve according to claim 3, wherein a valve seating portion (327) is formed to be protruded at one side of the first flowing portion (311) or the third flowing portion (313).

13. The flow control valve according to claim 12, wherein the valve seating portion (327) is protruded along a lower circumference of the first flowing portion (311) or the third flowing portion (313), and a corresponding portion (332) of the plate type valve (330) is tapered corresponding to the valve seating portion (327).

14. The flow control valve according to claim 13, wherein the flow control valve is further configured such that the plate type valve (330) assembled without the corresponding portion (332) matched to the valve seating portion (327) causes a part of the plate type valve (330) to protrude from an upper side of the main body (310) such that the main body (310) and the cover 340 are not capable of being assembled.

15. The flow control valve according to claim 4, wherein the first to fourth walls (301 to 304) are formed in a radial direction from the central shaft supporting portion (326).

16. The flow control valve according to claim 2, wherein the first port (321) is formed at a center portion of a circumference of the first flowing portion (311).

17. The flow control valve according to claim 16, wherein the flow control valve is further configured such that the plate type valve (330) divides a connecting portion of the first port (321) and the first flowing portion (311) into two sections having the same surface area when the plate type valve (330) is positioned at a middle portion of the first flowing portion (311) and the third flowing portion (313).

18. The flow control valve according to claim 17, wherein the third port (323) is formed at a center portion of a circumference of the third flowing portion (313).

19. The flow control valve according to claim 2, wherein a fixing portion (325) for fixing a bead (215) protruded outside an outer surface of each of the first inlet pipe (211), the second inlet pipe (212), the first outlet pipe (213) and the second outlet pipe (214) which are respectively connected to the ports (321, 322, 323 and 324) is formed at an end of each of the ports (321, 322, 323 and 324).

20. The flow control valve according to claim 19, further comprising a case 380 which is formed with a plane portion 381 which is closely contacted with a lower surface of the main body 310 so as to prevent separation of the first inlet pipe 211, the second inlet pipe 212, the first outlet pipe 213 and the second outlet pipe 214, and a supporting portion 382 which is vertically protruded at the plane portion 381 to be closed contacted with an outer surface of the pipes 211, 212, 213 and 214 so that a bead 215 of each pipes 211, 212, 213, 214 is fixed.

21. The flow control valve according to claim 20, wherein the case 380 is formed with a U-shaped mounting portion 383 formed at the supporting portion 382 so as to mount the first inlet pipe 211, the second inlet pipe 212, the first outlet pipe 213 or the second outlet pipe 214.

22. An air conditioner for an automobile, comprising:
an air-conditioning case (100) formed with a vent of which an opening degree is controlled by a door;
an evaporator (E) which is provided in the air-conditioning case (100);
a heater core (H) which is provided in the air-conditioning case (100) and provided with a flow control valve (300) according to any one of claim 1 to claim 7, claim 9, claim 11 to claim 16, and claim 18 to claim 21; and
a subsidiary door (150) of which an opening degree is controllable so as to control an air amount bypassing the heater core (H),
wherein a driving means (400) of the flow control valve (300) is connected with the subsidiary door (150) so as to be capable of interlockingly driving the subsidiary door (150) with the flow control valve (300).

\* \* \* \* \*